US009349048B2

(12) United States Patent
Kwak et al.

(10) Patent No.: US 9,349,048 B2
(45) Date of Patent: May 24, 2016

(54) METHOD OF TRACKING MOVING OBJECT, METHOD OF DETERMINING DISPLAY STATE OF MOVING OBJECT, AND CONTROL APPARATUS FOR TRACKING MOVING OBJECT

(71) Applicant: SAMSUNG ELECTRONICS CO., LTD., Suwon-si, Gyeonggi-do (KR)

(72) Inventors: No San Kwak, Suwon-si (KR); Seung Yong Hyung, Yongin-si (KR); Woong Kwon, Seongnam-si (KR); Ji Young Kim, Anyang-si (KR); Kwang Kyu Lee, Yongin-si (KR)

(73) Assignee: Smasung Electronics Co., Ltd., Gyeonggi-do (KR)

( * ) Notice: Subject to any disclaimer, the term of this patent is extended or adjusted under 35 U.S.C. 154(b) by 59 days.

(21) Appl. No.: 14/162,879

(22) Filed: Jan. 24, 2014

(65) Prior Publication Data
US 2014/0241577 A1 Aug. 28, 2014

(30) Foreign Application Priority Data
Feb. 28, 2013 (KR) ........................ 10-2013-0022486

(51) Int. Cl.
*G06K 9/00* (2006.01)
*G06T 7/20* (2006.01)
*G06T 7/00* (2006.01)

(52) U.S. Cl.
CPC .......... *G06K 9/00624* (2013.01); *G06T 7/0042* (2013.01); *G06T 7/208* (2013.01); *G06K 2209/057* (2013.01); *G06T 7/2033* (2013.01); *G06T 2207/10068* (2013.01); *G06T 2207/30021* (2013.01)

(58) Field of Classification Search
None
See application file for complete search history.

(56) References Cited

U.S. PATENT DOCUMENTS

| 8,837,778 | B1 * | 9/2014 | Chang ................. G06T 7/0046 |
| | | | 382/103 |
| 2002/0087101 | A1 * | 7/2002 | Barrick et al. ............... 600/587 |
| 2009/0088634 | A1 | 4/2009 | Zhao et al. |
| 2010/0220891 | A1 | 9/2010 | Lefevre et al. |
| 2010/0245587 | A1 * | 9/2010 | Otani et al. ................... 348/169 |
| 2010/0246997 | A1 * | 9/2010 | Porikli et al. ................ 382/291 |
| 2010/0268067 | A1 * | 10/2010 | Razzaque et al. ........... 600/424 |

FOREIGN PATENT DOCUMENTS

| KR | 10-2012-0130462 | 12/2012 |
| KR | 10-1284087 | 7/2013 |

OTHER PUBLICATIONS

Chen et al. "A Particle Filtering Framework for Joint Video Tracking and Pose Estimation." IEEE Transactions on Image Processing, vol. 19, No. 6, Jun. 2010, pp. 1625-1634.*

* cited by examiner

*Primary Examiner* — Jon Chang
(74) *Attorney, Agent, or Firm* — Harness, Dickey & Pierce, P.L.C.

(57) ABSTRACT

A method of tracking a moving object includes measuring displacement of an object to be tracked, obtaining a particle of the object to be tracked using the measured displacement, and tracking the object using pose information of the object in an image thereof and the obtained particle. A control apparatus includes an imaging module to perform imaging of an object and generates an image, and a tracking unit to acquire displacement and pose information of the object using the generated image of the object, to set a particle of the object using the acquired displacement of the object, and to track the object using the pose information of the object and the particle.

17 Claims, 26 Drawing Sheets (a)   (b)

FIG. 11A
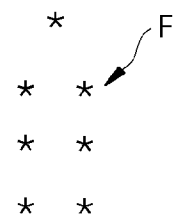
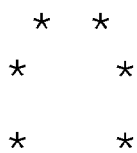

METHOD OF TRACKING MOVING OBJECT, METHOD OF DETERMINING DISPLAY STATE OF MOVING OBJECT, AND CONTROL APPARATUS FOR TRACKING MOVING OBJECT

CROSS-REFERENCE TO RELATED APPLICATIONS

This application claims the priority benefit of Korean Patent Application No. 10-2013-0022486, filed on Feb. 28, 2013 in the Korean Intellectual Property Office, the disclosure of which is incorporated herein by reference.

BACKGROUND

1. Field

Embodiments disclosed herein relate to a method of tracking a moving object, a method of determining a display state of the moving object, and a control apparatus for tracking the moving object.

2. Description of the Related Art

Minimally invasive surgery generally refers to surgical procedures minimizing an incision size and having a reduced recovery time. Minimally invasive surgery may refer to a surgical method wherein at least one small incision, e.g., incisions having a size of about 0.5 cm to about 1.5 cm, is formed in the skin in the vicinity of an affected site of a human body. Various surgical instruments such as an endoscope and the like are inserted through the small incision, and an operation is performed while viewing an image generated by the endoscope. Thus, minimally invasive surgery is advantageous in terms of less pain after surgery and rapid recovery of a patient as compared to open surgery. Such minimally invasive surgery is used in various fields such as cholecystectomy, prostate cancer surgery, hernia repair, and the like.

In general, a surgical robot for minimally invasive surgery includes a master console and a slave robot. The master console generates a predetermined control signal according to operator manipulation and transmits the control signal to the slave robot. The slave robot receives the predetermined control signal to perform predetermined surgical procedures upon a patient. In a surgical process, the master console and the slave robot may be integrally configured or independently configured.

Minimally invasive surgery using such a surgical robot generally refers to a surgical procedure performed by inserting surgical tools and surgical instruments, equipped with the surgical tools, of the slave robot into the body of a patient. In this regard, after inserting the surgical tools and the surgical instruments into the body of the patient, circumstances in the body of the patient are observed from an image collected by an endoscope, which may be considered as one of the surgical tools.

SUMMARY

Therefore, it is an aspect of the present invention to provide a method of tracking a moving object that easily and appropriately tracks objects to be tracked, a method of determining a display state of the moving object, and a control apparatus for tracking the moving object.

Additional aspects of the invention will be set forth in part in the description which follows and, in part, will be apparent from the description, or may be learned by practice of the invention.

To address the above-described problems, there are provided a method of tracking a moving object, a method of determining a display state of the moving object, and a control apparatus for tracking the moving object.

In accordance with one aspect of the present invention, a method of tracking a moving object includes measuring a displacement of an object to be tracked, obtaining a particle of the object to be tracked using the measured displacement, and tracking the object using pose information of the object and the obtained particle.

In this case, the displacement of the object may be acquired from an image of the object using feature points of the object.

In addition, the tracking may be performed by calculating a weight of the particle using the pose information of the object in the image and determining an appropriate particle for the object using the calculated weight to estimate a pose of the object.

The particle may include estimates for a location and direction of an end portion of the object. The particle may be obtained by obtaining a plurality of particles of the object using the measured displacement of the object.

The method may further include re-selecting or resetting at least one particle from among the obtained particles according to the calculated weight.

Post-movement pose information of the object may be acquired from an image of the object. The post-movement pose information of the object may be acquired by extracting feature points of the object, acquiring contour information of the object from the feature points of the object, obtaining a convex hull for the feature points using the contour information, and calculating location information and direction information for an end portion of the convex hull.

The measuring of the displacement may include extracting feature points of the object and measuring the displacement of the object based on displacements of the feature points.

The method may further include setting a region of interest containing the object to be tracked, wherein the setting comprises detecting the object by matching an image generated by an imaging module with feature points and setting the region of interest based on the detection results.

In accordance with another aspect of the present invention, a control apparatus for tracking a moving object includes an object to be tracked, an imaging module to perform imaging of the object to generate an image, and a tracking unit to measure a displacement of the object using an image of the object generated by the imaging module, to obtain a particle of the object using the measured displacement, to acquire post-movement pose information of the object, and to track the object using the post-movement pose information of the object and the obtained particle.

The tracking unit may calculate a weight for the particle using the pose information of the object and then track the object using the calculated weight for the particle and the particle. The tracking unit may obtain a plurality of particles of the object using the acquired displacement of the object. The tracking unit may select at least one particle from among the obtained particles according to the calculated weight.

The tracking unit may acquire post-movement pose information of the object by extracting feature points of the object, acquiring contour information of the object from the feature points of the object, obtaining a convex hull for the feature points using the contour information, and calculating location information and direction information for an end portion of the convex hull. The particle may include estimates for a location and direction of an end portion of the object.

The pose information of the object may include information on location and direction of the end portion of the object.

The control apparatus may further include a region of interest setting unit to set a region of interest containing the object to be tracked, wherein the region of interest setting unit may detect the object by matching the image generated by the imaging module with feature points and sets the region of interest based on the detection results.

The tracking unit may determine a display state of the object based on the extracted feature points, the display state corresponding to one of an image containing substantially all of the object, an image partially containing the object, and an image in which the object is not contained. The display state of the object may be determined based on a comparison between the number of extracted feature points and a number of tracked feature points. The display state of the object may be determined by matching the extracted feature points with feature points detected in a region of interest of the image. The display state of the object may be determined by comparing the displacement of the feature points with a threshold value.

In accordance with another aspect of the present invention, a method of determining a display state of a moving object includes extracting tracked feature points of an object to be tracked from an image of the object, and determining the display state of the object in the image using the extracted tracked feature points.

The display state of the object may be determined based on the extracted feature points, the display state corresponding to one of an image containing substantially all of the object, an image partially containing the object, and an image in which the object is not contained.

The display state of the object may be determined based on a comparison between the number of extracted feature points and a number of tracked feature points. The display state of the object may be determined by matching the extracted feature points with feature points detected in a region of interest of the image. The display state of the object may be determined by comparing the displacement of the feature points with a threshold value.

In accordance with another aspect of the present invention, a robot may be used to perform an operation on an object, the robot including a master console and a slave robot to receive an input from the master console. The slave robot may include a tool to perform an operation on the object and an imaging unit to capture an image of the tool. The master console may include a driving control unit to transmit an input to the slave robot to control movement of the tool and a tracking unit to track the tool based on the captured image.

The tracking unit may track the tool by measuring a displacement of the tool when the tool is moved, by performing particle filtering using the measured displacement, and by obtaining pose information of the tool. The tracking unit may extract a first set of feature points of the tool before movement of the tool, and a second set of feature points of the tool after movement of the tool, and measure a displacement of the object by comparing the first set of feature points with the second set of feature points. The tracking unit may determine a display state of the tool in the image using the first set of feature points of the tool, the display state corresponding to one of an image containing substantially all of the object, an image partially containing the object, and an image in which the object is not contained.

BRIEF DESCRIPTION OF THE DRAWINGS

These and/or other aspects of the invention will become apparent and more readily appreciated from the following description of the embodiments, taken in conjunction with the accompanying drawings of which:

FIGS. 11A to 11D are views for explaining a method of acquiring pose information of an object to be tracked;

DETAILED DESCRIPTION

Figure 1:
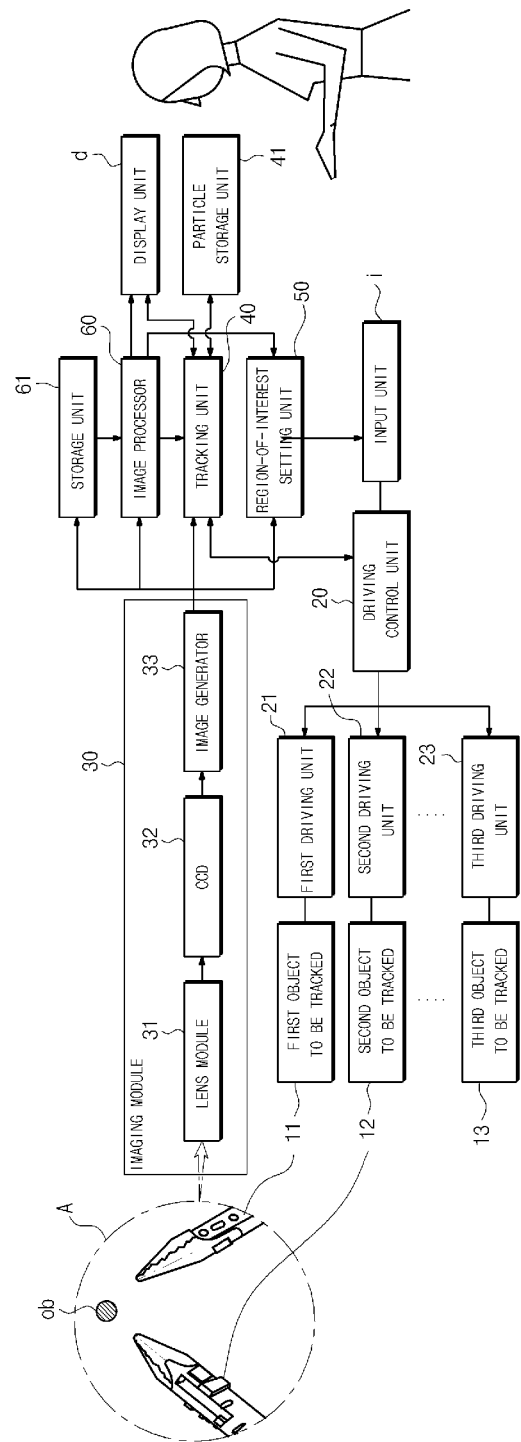
FIG. 1 is a block diagram of a control apparatus for tracking a moving object, according to an embodiment of the present invention.

Reference will now be made in detail to embodiments of the present invention, examples of which are illustrated in the accompanying drawings, wherein like reference numerals refer to like elements throughout.

Hereinafter, a control apparatus and method for tracking a moving object, according to embodiments of the present invention, will be described in detail with reference to FIGS. 1 to 13.

FIG. 1 is a block diagram of a control apparatus for tracking a moving object, according to an embodiment of the present invention.

Referring to FIG. 1, the control apparatus may move or change a direction of objects to be tracked 11 to 13 according to user manipulation or predetermined settings. The control apparatus may also track motion of the objects to be tracked 11 to 13 and transmit the tracked motion to the user.

To implement such operations, the control apparatus may include the objects to be tracked 11 to 13 that are driven by a driving control unit 20 according to user manipulation or predetermined settings, an imaging module 30 to generate an image of the objects to be tracked 11 to 13 by image capturing, and a tracking unit 40 to track the objects to be tracked 11 to 13 based on the image generated by the imaging module 30. While FIG. 1 illustrates three objects which are tracked, there may be one or two objects which are tracked, or more than three objects which are tracked.

The control apparatus for tracking a moving object according to an embodiment of the present invention will now be described in detail with reference to FIG. 1.

As illustrated in FIG. 1, the control apparatus may include an input unit i, the driving control unit 20, first, second and third driving units 21, 22 and 23, first, second and third objects to be tracked 11, 12 and 13, the imaging module 30, the tracking unit 40, a region-of-interest setting unit 50, an image processor 60, and a display unit d.

The input unit i may receive manipulation commands from a user to manipulate the first, second and third objects to be tracked 11, 12 and 13. According to embodiments, the input unit i may include various input members, such as a stick, a lever, a haptic device, a clutch pedal, various kinds of handles, various switches and buttons, a touch screen, and the like to manipulate the first, second and third objects to be tracked 11, 12 and 13. The input unit i may also include a voice recognition device, keys, a joystick, a keyboard, a mouse, and the like to enable a user to control the surgical robot using the input unit i. The input unit i may include all or only some of the above-described input members.

In an embodiment, the input unit i enables the first, second and third objects to be tracked 11, 12 and 13 to move in accordance with an intention of a user by generating a driving force or a predetermined electrical signal according to a user manipulation and transmitting the driving force or the electrical signal to the driving control unit 20 or the first, second and third driving units 11, 12 and 13 (e.g., via a direct transmission).

The driving control unit 20 drives the first, second and third driving units 21, 22 and 23. In particular, the driving control unit 20 may receive a driving force or a predetermined electrical signal from the input unit i, the tracking unit 40, or the like. When the driving control unit 20 receives the driving force, the driving control unit 20 transmits the driving force to the first, second and third driving units 21, 22 and 23 to drive the first, second and third driving units 21, 22 and 23. When the driving control unit 20 receives the predetermined electrical signal, the driving control unit 20 generates a separate control signal according to the transmitted electrical signal and then transmits the generated control signal to the first, second and third driving units 21, 22 and 23 to drive the first, second and third driving units 21, 22 and 23.

In addition, the driving control unit 20 may drive the first, second and third driving units 21, 22 and 23 by generating control signals for the first, second and third driving units 21, 22 and 23 according to separate pre-stored settings without user manipulation using the input unit i or the like.

The first, second and third driving units 21, 22 and 23 may be driven according to the driving force or control signal transmitted from the driving control unit 20 to drive the first, second and third objects to be tracked 11, 12 and 13. In an embodiment, the first, second and third driving units 21, 22 and 23 may be physically directly connected to the driving control unit 20. In another embodiment, the first, second and third driving units 21, 22 and 23 may be connected to the driving control unit 20 via a wired or wireless communication network (or a combination thereof) and thus may be driven by receiving the control signal from the driving control unit 20.

In an embodiment, the first, second and third driving units 21, 22 and 23 may correspond to robot arms. In this case, end portions (or end effectors) of the first, second and third driving units 21, 22 and 23 may be respectively connected to the first, second and third objects to be tracked 11, 12 and 13 by mounting or the like.

In addition, when the first, second and third driving units 21, 22 and 23 are robot arms, each of the driving units 21, 22 and 23 may include a plurality of links and a plurality of wrists, and positions, directions, poses, or the like of the first, second and third objects to be tracked 11, 12 and 13 may be controlled according to operations of the corresponding links and wrists. In addition, the first, second and third objects to be tracked 11, 12 and 13 may rotate about a predetermined shaft.

The first, second and third objects to be tracked 11, 12 and 13 may be tracked by the control apparatus for tracking a moving object while moving, rotating, or the like according to a user manipulation, predetermined settings, or the like. As illustrated in FIG. 1, the first, second and third objects 11, 12 and 13 may include various equipment or instruments, for example, surgical instruments. Each robot arm may include one or more instruments. In some embodiments, the first, second and third objects 11, 12 and 13 may also correspond to robot hands. Each of the first, second and third objects 11, 12 and 13 may perform predetermined operations for an object ob through various motions such as movement, rotation, change of direction, and the like. An image of the first, second and third objects 11, 12 and 13 may be captured by the imaging module 30.

Examples of surgical instruments may include a skin holder, a suction line, a scalpel, scissors, a grasper, a surgical needle, a needle holder, a stapler, a cutting blade, and the like, without being limited thereto. Other examples of surgical instruments may include a micro-dissector, tacker, suction irrigation tool, clip applier, irrigator, catheter, suction orifice, surgical knife, surgical forceps, cautery (i.e., a tool for burning or cutting a diseased part by using electric energy or heat energy), and the like. An endoscope may be considered as a surgical instrument and may include various surgical endoscopes, such as a thoracoscope, an arthroscope, a rhinoscope, a cysotoscope, a rectoscope, a duodenoscope, and a cardioscope, in addition to a laparoscope that is generally used in robotic surgery. Any known tools required for surgery may also be used. That is, surgical instruments may refer to any tool or device which may be used to perform an operation such as surgery.

Although FIG. 1 illustrates the first, second and third objects 11, 12 and 13 as examples of objects to be tracked, the number of objects to be tracked may be determined according to a user or settings of the control apparatus. For example, the number of objects to be tracked may be one, two, or at least four.

The imaging module 30 generates an image by capturing the first, second and third objects 11, 12 and 13 or the object ob and surroundings thereof. For example, the imaging module 30 may receive visible light or infrared light and generate an image based on the received visible light or infrared light. In some embodiments, the imaging module 30 may generate an image by receiving electromagnetic waves such as X-rays or generate an image of the object ob using ultrasonic waves or the like. In addition, various apparatuses for acquisition of an image of the object ob may be used as the imaging module 30.

The imaging module 30 may capture an image of all or some of objects to be tracked that are controlled by the driving control unit 20 or the like. That is, the imaging module 30 may capture an image of a plurality of objects to be tracked, for example, two of the first, second and third objects 11, 12 and 13, e.g., only the first and second objects 11 and 12. In this case, the tracking unit 40, which will be described below, may track only some captured objects among the objects to be tracked.

Referring to FIG. 1, the imaging module 30 may include a lens module 31, a charge coupled device (CCD) 32, and an image generator 33.

The lens module 31 receives predetermined light and focuses the received light. Focus on the object ob may be adjusted according to a combination of a plurality of lens modules 31.

The CCD 32 includes a plurality of photodiodes that convert the focused light into electrical signals (charges). Each photodiode generates electrons according to photons of received visible light to generate and output an electrical signal for an image.

The image generator 33 generates raw image data that are visually read by a human using the electrical signal output from the CCD 32 and outputs the generated raw image data.

The raw image data output from the image generator 33 of the imaging module 30 may be transmitted to the tracking unit 40, the region-of-interest setting unit 50, an image processor 60, and/or a storage unit 61.

In addition, the raw image data may be directly transmitted to the display unit d such as a monitor apparatus or the like that is installed at the control apparatus or the like or connected thereto via a wired or wireless communication network. In this case, the display unit d may display the transmitted raw image data to a user. The display unit d may be embodied by, for example, a Liquid Crystal Display (LCD), light emitting diode (LED) display, organic light emitting diode (OLED) display, plasma display panel (PDP), cathode ray tube (CRT), and the like.

The tracking unit 40 may track the first, second and third objects 11, 12 and 13 based on the image generated by the image generator 33. In particular, the tracking unit 40 may track the first, second and third objects 11, 12 and 13 using a displacement and a particle of the first, second and third objects 11, 12 and 13. In this case, each particle may be separately calculated by the tracking unit 40 according to the first, second and third objects 11, 12 and 13 or may be stored in a separate particle storage unit 41. In some embodiments, the tracking unit 40 may use both the separately calculated particles and the particles stored in the particle storage unit 41.

In some embodiments, the tracking unit 40 may extract feature points F of the first, second and third objects 11, 12 and 13 from the image generated by the image generator 33 and calculate displacements of the first, second and third objects 11, 12 and 13 using the feature points F.

In addition, the tracking unit 40 may acquire post-movement pose information of the first, second and third objects 11, 12 and 13 from the image thereof to track the first, second and third objects 11, 12 and 13. In this case, it may be possible to calculate a weight for each particle of the first, second and third objects 11, 12 and 13 using the pose information of the first, second and third objects 11, 12 and 13 in the image.

Moreover, the tracking unit 40 may further perform particle re-sampling by selecting only some of particles of each object from a plurality of particles based on the calculated weight. The selected particles may be stored in the particle storage unit 41 or the like. The particle storage unit 41 may be embodied as a storage medium, such as a nonvolatile memory device, such as a Read Only Memory (ROM), Programmable Read Only Memory (PROM), Erasable Programmable Read Only Memory (EPROM), and flash memory, a volatile memory device such as a Random Access Memory (RAM), a hard disc, and an optical disc, or combinations thereof. However, examples of the particle storage unit are not limited to the above description, and the particle storage unit may be realized by other various devices and structures as would be understood by those skilled in the art.

As desired, tracking processes performed by the tracking unit 40 may be partially imaged and displayed on the display unit d, and a user may visually check the tracking processes via the image displayed on the display unit d.

In addition, the tracking unit 40 may determine a display state of the first, second and third objects 11, 12 and 13 in an image thereof using the feature points F of the first, second and third objects 11, 12 and 13. In this regard, the display state of the first, second and third objects 11, 12 and 13 may be one state selected from an "all display state" in which all of the first, second and third objects 11, 12 and 13 are displayed in an image, a "partial display state" in which the first, second and third objects 11, 12 and 13 are partially displayed in an image, and a "non-display state" in which all or almost all of the first, second and third objects 11, 12 and 13 are not displayed in an image.

The region-of-interest setting unit 50 sets a region of interest based on instructions or commands of a user input via the input unit i, predetermined settings, or the image generated by the image generator 33. The region of interest may refer to a region of an image including portions or all of the objects to be tracked, i.e., the first, second and third objects 11, 12 and 13.

The region-of-interest setting unit 50 may set a region of interest in the image generated by the image generator 33 before image processing or an image corrected by the image processor 60 (e.g., after image processing).

In an embodiment, the region-of-interest setting unit 50 may set the entire region or a partial region of the image generated by the image generator 33 before image processing or the image corrected by the image processor 60 as a region of interest according to information input via the input unit i by a user. In this case, as desired, an image for setting of the region of interest, e.g., the image generated by the image generator 33, a window that separates other areas from a partial area to set the region of interest, and the like may be displayed on the display unit d. That is, a window may be displayed on a display unit which separates other areas from an area which is designated as a region of interest.

In another embodiment, the region-of-interest setting unit 50 may set a region of interest using feature points of the first, second and third objects 11, 12 and 13 contained in the image thereof according to predetermined settings in addition to user manipulation. For example, the region-of-interest setting unit 50 may perform feature point matching using the image of the first, second and third objects 11, 12 and 13 and a real-time screen image, detect the first, second and third objects 11, 12 and 13 according to feature point matching results, and then set a region of interest according to the detection results.

In addition, the region-of-interest setting unit 50 may set a region of interest using kinematic information that controls the first, second and third objects 11, 12 and 13.

When the region of interest is set by the region-of-interest setting unit 50, the tracking unit 40 may extract feature points only from an object in the region of interest, i.e., the first, second and third objects 11, 12 and 13.

The image processor 60 may perform predetermined image processing using raw image data transmitted from the image generator 33 or stored in the storage unit 61. In this case, the image processor 60 may perform post processing, such as correction of contrast, brightness, sharpness, or the like of the raw image data or the corrected image to completely or partially correct the raw image data. Accordingly, the raw image data may be partially emphasized or attenuated.

In addition, if the imaging module 30 does not include the image generator 33, the image processor 60 may generate a predetermined image corresponding to the output electrical signal using the electrical signal output from the CCD 32 of the imaging module 30.

The image processor 60 may implement an image conversion process by reducing resolution of the generated raw image or compressing the raw image data for reduction in size thereof. In addition, as desired, the image processor 60 may generate a three-dimensional stereoscopic image using a plurality of images.

The image corrected or generated by the image processor 60 may be displayed on the display unit d.

The storage unit 61 may store the image generated by the image generator 33 or an image generated or post-processed by the image processor 60. The image stored in the storage unit 61 may be displayed on the display unit d according to display commands or the like of a user. The storage unit 61 may be embodied as a storage medium, such as a nonvolatile memory device, such as a Read Only Memory (ROM), Programmable Read Only Memory (PROM), Erasable Programmable Read Only Memory (EPROM), and flash memory, a volatile memory device such as a Random Access Memory (RAM), a hard disc, and an optical disc, or combinations thereof. However, examples of the storage unit are not limited to the above description, and the particle storage unit may be realized by other various devices and structures as would be understood by those skilled in the art.

Hereinafter, a method of tracking a moving object using the above-described control apparatus will be described.

Figure 2:
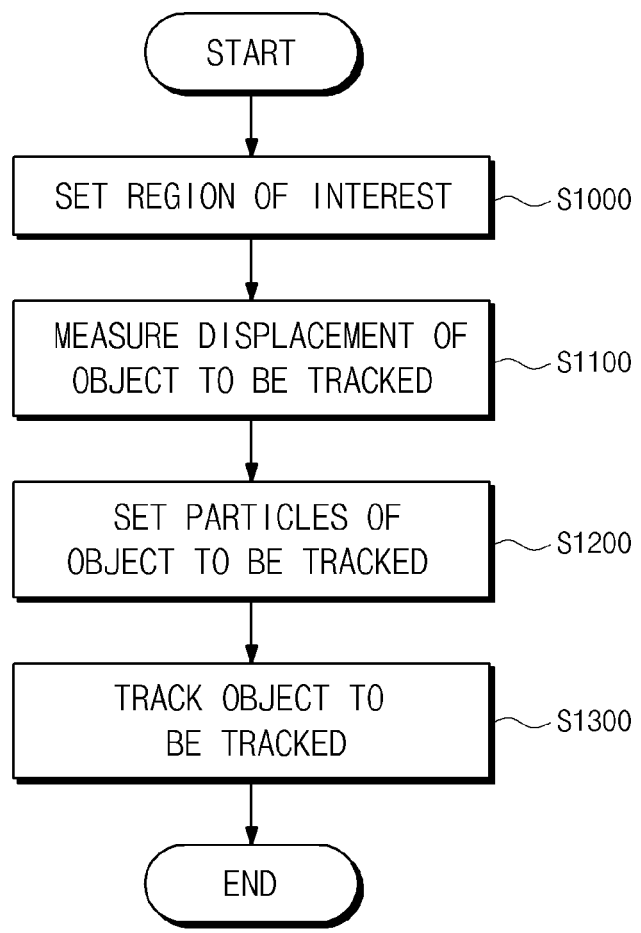
FIG. 2 is a flowchart illustrating a moving object tracking method according to an embodiment of the present invention.

FIG. 2 is a flowchart illustrating a moving object tracking method according to an embodiment of the present invention.

According to an embodiment of the present invention illustrated in FIG. 2, a moving object may be tracked by first setting a region of interest (operation S1000). The region of interest may be manually set according to user manipulation or be set based on the image generated by the image generator 33. In addition, the region of interest may be set according to kinematic information regarding the first, second and third objects 11, 12 and 13. Setting of the region of interest may be performed by the above-described region-of-interest setting unit 50.

When the region of interest is set, displacements of the first, second and third objects 11, 12 and 13 in the region of interest may be measured (operation S1100). Hereinafter, a displacement measurement method according to an embodiment of the present invention will be described.

Figure 3:
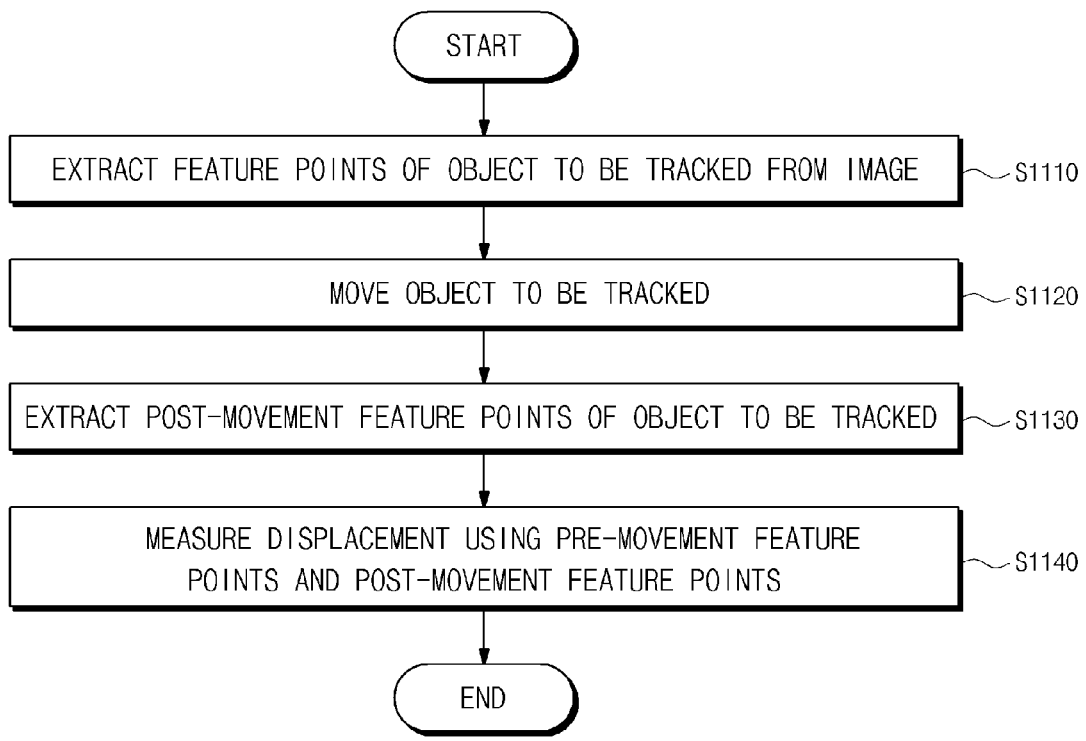
FIG. 3 is a flowchart illustrating a method of measuring displacement of an object to be tracked, according to an embodiment of the present invention.
Figure 4:
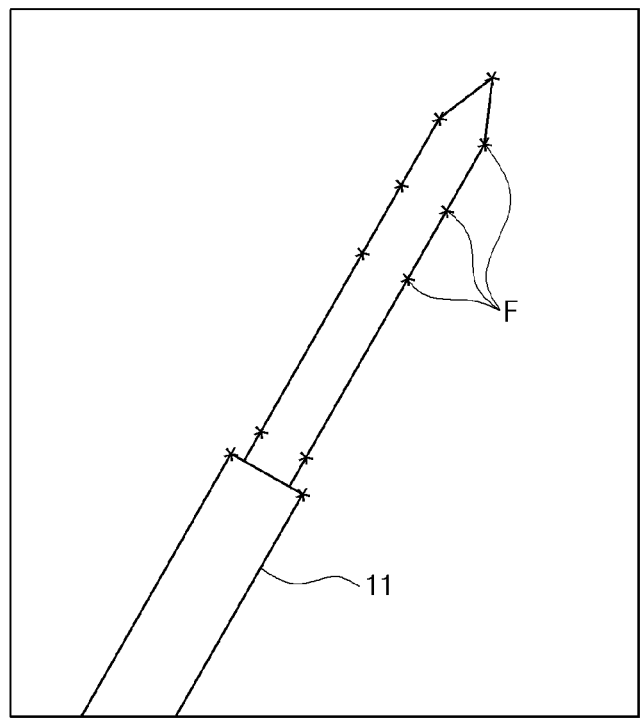
FIGS. 4 to 6 are views for explaining a method of measuring displacement of an object to be tracked.
Figure 5:
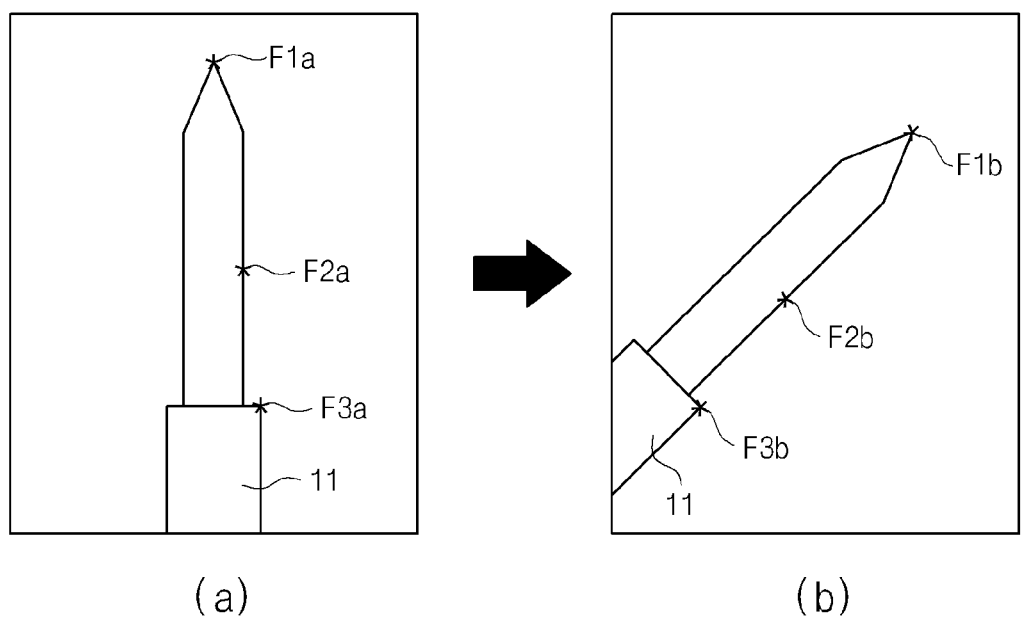
Figure 6:
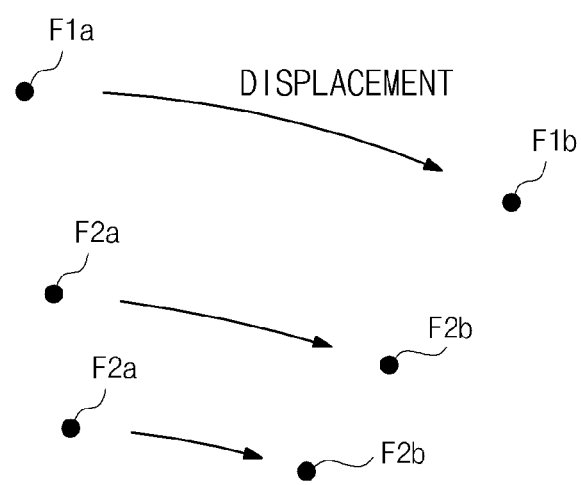

FIG. 3 is a flowchart illustrating a method of measuring displacements of the first, second and third objects 11, 12 and 13, according to an embodiment of the present invention. FIGS. 4 to 6 are views for explaining a method of measuring displacement of the first object 11.

As illustrated in FIG. 3, feature points of the first, second and third objects 11, 12 and 13 contained in the image thereof may be extracted to measure displacements thereof (operation S1110).

Feature points F, as used herein, may refer to those points of an image of an object that are representative of certain characteristics of the object, such as a particular point that enables identification of the shape of the object, such as a pattern, color, outline (e.g., edge or corner), configuration or the like of the object, or a distinction between the object and another object.

FIG. 4 illustrates feature points F of the first object 11. As illustrated in FIG. 4, some points at an outline of an end portion of the first object 11 are extracted as the feature points F. In real or practical applications, however, the feature points F are not simply located only in an outer portion of the object and various portions of the object, e.g., protrusions on a surface of the first object 11, or the like may also be extracted as the feature points F. In addition, the number of feature points F may be greater than that illustrated in FIG. 4 or an arrangement type of the feature points F may be more complicated than that illustrated in FIG. 4. For convenience of explanation only, the extracted feature points F illustrated in FIG. 4 are simplistic.

When the first object 11 performs a motion such as movement, change of direction, or the like (S1120), the feature points F of the first object 11 are also changed in accordance with the motion of the first object 11. In particular, as illustrated in FIG. 5, when the first object 11 rotates clockwise while moving in a left direction, extracted feature points F1a to F3a of the first object 11 illustrated in FIG. 5(a) also move to predetermined positions as illustrated in FIG. 5(b). Only movement of the feature points F1a to F3a excluding the first object 11 is illustrated in FIG. 6. Changes in such feature points F of a moving object include changes in position, shape, direction or the like of the object, and thus, displacement measurement of the feature points F of the moving object may refer to or correspond to displacement measurement of the object.

Thus, when the first object 11 moves, post-movement feature points F1b to F3b of the first object 11 are extracted (operation S1130), and displacement of the first object 11 is measured using pre-movement feature points F1a to F3a of the first object 11 and the post-movement feature points F1b to F3b of the first object 11 (operation S1140).

The displacement of the first object 11 may be measured using displacement of each of the feature points F1a to F3a. In addition, an average of the displacements of the respective feature points F1a to F3a may be calculated and the calculated average thereof may be used to calculate the displacement of the first object 11.

In this case, the displacement of the first object 11 may be calculated using Equation 1 below:

$$\Delta u = a_t - a_{t-1}$$ [Equation 1]

wherein $\Delta u$ denotes the displacement of the first object 11, $a_t$ denotes image coordinates of the feature points F1b to F3b at time t, and $a_{t-1}$ denotes image coordinates of the feature points F1a to F3a at time (t−1). That is, $a_{t-1}$ may correspond to image coordinates of post-movement feature points and $a_t$ may correspond to image coordinates of pre-movement feature points.

As described above, when the displacements of the first, second and third objects 11, 12 and 13 are measured (operation S1100), as illustrated in FIG. 2, particles of the first, second and third objects 11, 12 and 13 are set and particle filtering is performed thereon (operation S1200). In operations S1100 and S1200, post-movement poses of the first, second and third objects 11, 12 and 13 are estimated by generating probability distribution for post-movement poses (e.g., positions or directions) of the first, second and third objects 11, 12 and 13.

In this case, estimation of the post-movement poses of the first, second and third objects 11, 12 and 13 using probability distribution may be performed by generating probability distribution for the post-movement poses of the first, second and third objects 11, 12 and 13 based on the displacement $\Delta u$ of feature points of each object and selecting and extracting some locations or regions of the generated probability distribution according to predetermined standards to extract and set particles for the first, second and third objects 11, 12 and 13.

Figure 7:
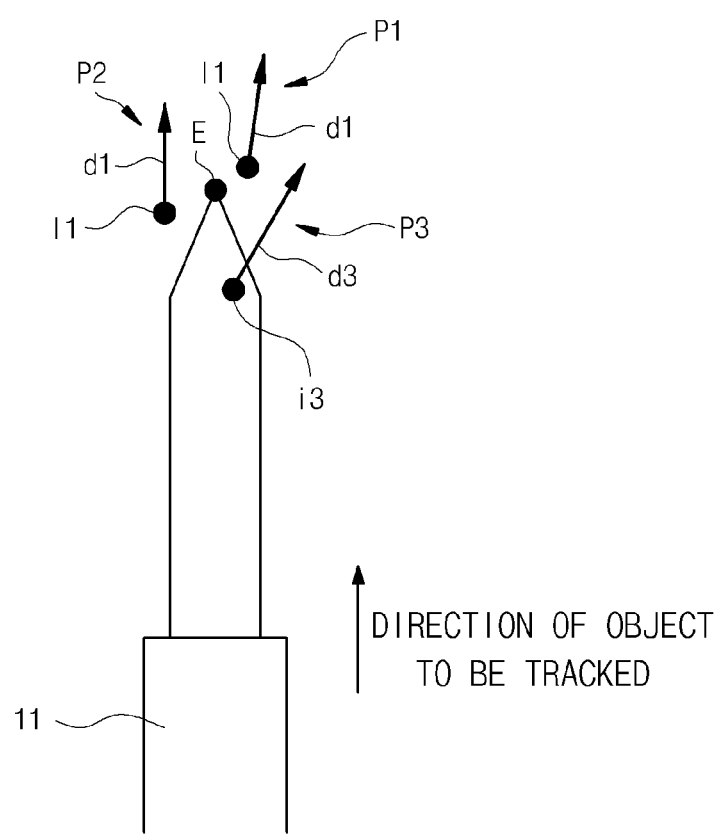
FIGS. 7 and 8 are views for explaining particles of an object to be tracked.
Figure 8:
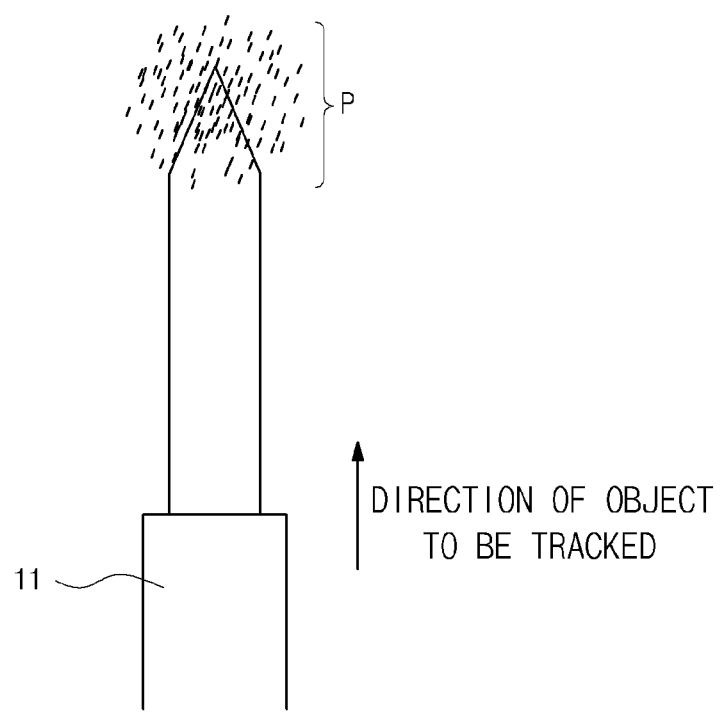

Hereinafter, a particle setting process will be described with reference to FIGS. 7 and 8. FIGS. 7 and 8 are views for explaining particles P of the first object 11.

The particles P may be virtual particles for estimation and prediction of a position, shape and/or direction of a moving object or a particular location in the moving object, with predetermined errors. Thus, the particles P may include estimates for position, direction or the like of the moving object or the particular location therein. For example, the particles P may include both estimates for locations of particular portions of each object and an estimate for a direction of each object or a particular portion of each object.

For illustrative representation, the particles P are represented by dots and arrows in FIG. 7. In FIG. 7, dots I denote estimated positions for particular portions of the first object 11, and arrows d denote estimated directions of the particular portions of the first object 11.

As described above, each particle P estimates a position or direction of a predetermined location. In this case, a plurality of particles P may be used for accurate estimation of a position or direction of one location. For example, FIG. 7 illustrates a particular end portion E of the first object 11 and the plurality of particles P, i.e., first, second and third particles P1, P2 and P3 each estimating a direction of the first object 11.

With reference to FIG. 7, the first particle P1 estimates a position and direction of the particular end portion E of the first object 11 as I1 and d1, respectively, the second particle P2 as I2 and d2, respectively, and the third particle P3 as I3 and d3, respectively.

FIG. 8 illustrates that a considerable number of particles P for the first object 11 are set in the vicinity of the first object 11. As illustrated in FIG. 8, the number of particles P each estimating the particular end portion E of the first object 11 and the direction of the first object 11 may be greater than the number of the particles P1, P2 and P3. In particular, the number of particles P each estimating the particular end portion E of the first object 11 and the direction of the first object 11 may be, for example, 50 to 200 or much greater.

As illustrated in FIG. 8, if the particles P estimate a location and direction of the end portion E of the first object 11, the particles P are assumed to be disposed and distributed in the vicinity of the estimated end portion E of the first object 11.

The number of particles P (e.g., first, second and third particles P1, P2 and P3) estimating the first object 11 may be determined according to predefined settings or may be selected by a user.

The particles P may be separately calculated by the tracking unit 40 according to the first object 11. In another embodiment, the particles P may be pre-stored in the particle storage unit 41 or the like and called by the tracking unit 40.

The post-movement particles P of the first object 11 may be acquired and set using various methods.

In an embodiment, the post-movement particles P of the first object 11 may be acquired by calculating at least one post-movement particle P of the first object 11 using pre-movement particles P set for the first object 11.

In another embodiment, the post-movement particles P for the first object 11 may be acquired by acquiring or calculating a probability distribution for a post-movement pose of the first object 11 and extracting some locations or regions of the acquired probability distribution.

In the above-described embodiments, more particularly, the post-movement particles P for the first object 11 may be acquired by calculation of the post-movement particles P of the first object 11 using the acquired displacement Δu of the first, second or third objects 11, 12 or 13.

According to an embodiment, if at least one particle P for the first, second and third objects 11, 12 and 13 before a predetermined motion is acquired, at least one particle P for the objects after the predetermined motion may be acquired by applying the displacement Δu of the corresponding object to the particle P for the objects before the predetermined motion.

In this case, when the displacement Δu is given as Equation 1 above, post-movement particles P for the first object 11 may be calculated as represented in Equation 2 below:

$$P_t = P_{t-1} + \Delta u \qquad \text{[Equation 2]}$$

wherein $P_t$ is a value for a particle at time t, and $P_{t-1}$ is a value for a particle at time (t−1). In some embodiments, $P_t$ or $P_{t-1}$ may be coordinates for a position of the first object 11 and/or vector values for a direction of the first object 11.

When the displacement Δu is given as a predetermined position conversion function instead of Equation 1 above, the post-movement particles P for the first object 11 may be calculated using Equation 3 below:

$$P_t = \Delta u \cdot P_{t-1} \qquad \text{[Equation 3]}$$

Similarly, in Equation 3, $P_t$ is a value for a particle at time t, and $P_{t-1}$ is a value for a particle at time (t−1). That is, $P_{t-1}$ may correspond to coordinates and/or vector values of post-movement particles and $P_t$ may correspond to coordinates and/or vector values of pre-movement particles. In some embodiments, $P_t$ or $P_{t-1}$ may be coordinates for a position of the first object 11 or vector values for a direction of the first object 11. Δu is a position conversion function. As desired, the position conversion function Δu may be represented in the form of a matrix.

The post-movement particles P for the first object 11 may be calculated using the above-described methods.

According to another embodiment, if the particles P of the first object 11 are obtained using a probability distribution for a post-motion pose of the first object 11, at least one post-motion (e.g., post-movement) particle P of the first object 11 may be acquired by applying the displacement Δu to the probability distribution and extracting the at least one particle P of the first object 11 from the displacement Δu-applied probability distribution.

In this case, specifically, first, the measured displacement Δu is applied to probability distribution for a pre-motion pose of the first, second and third objects 11, 12 and 13 using a method such as adding, multiplying, or the like to calculate probability distribution for the post-motion pose of the first object 11, and at least one particle P of the first object 11 is extracted from the calculated distribution for the post-motion pose of the first object 11, thereby sampling the particles P of the first object 11.

Although the method of calculating the particles P of the first object 11 by applying the measured displacement Δu to the particle P or the probability distribution for the pose of the first object 11 has been described above, calculation of the particles P of the first object 11 is not limited thereto. That is, calculation of the particles P of the first object 11 may be performed using various other methods using the measured displacement Δu.

The particles P of the first object 11 are sampled using the above-described methods.

In one embodiment, as illustrated in FIG. 2, after the particles P of the first object 11 are set by sampling, the first object 11 may be tracked using the particles P of the first object 11 (operation S1300).

Figure 9:
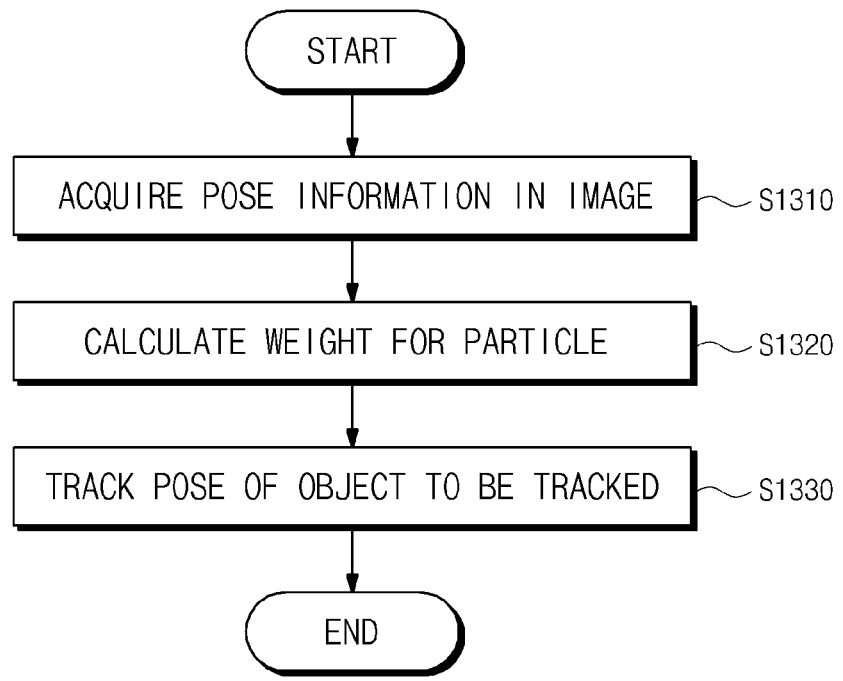
FIG. 9 is a flowchart illustrating a method of tracking an object to be tracked, according to an embodiment of the present invention.

FIG. 9 is a flowchart illustrating a method of tracking the first, second and third objects 11, 12 and 13, according to an embodiment of the present invention.

As illustrated in FIG. 9, first, pose information of each of the first, second and third objects 11, 12 and 13 is acquired from an image thereof to track the first, second and third objects 11, 12 and 13 (operation S1310). Subsequently, a weight to be applied to each particle of the corresponding object is calculated using the acquired pose information (operation S1320). The first, second and third objects 11, 12 and 13 are tracked using the calculated weights (operation S1330).

Each operation will now be described in further detail.

Figure 10:
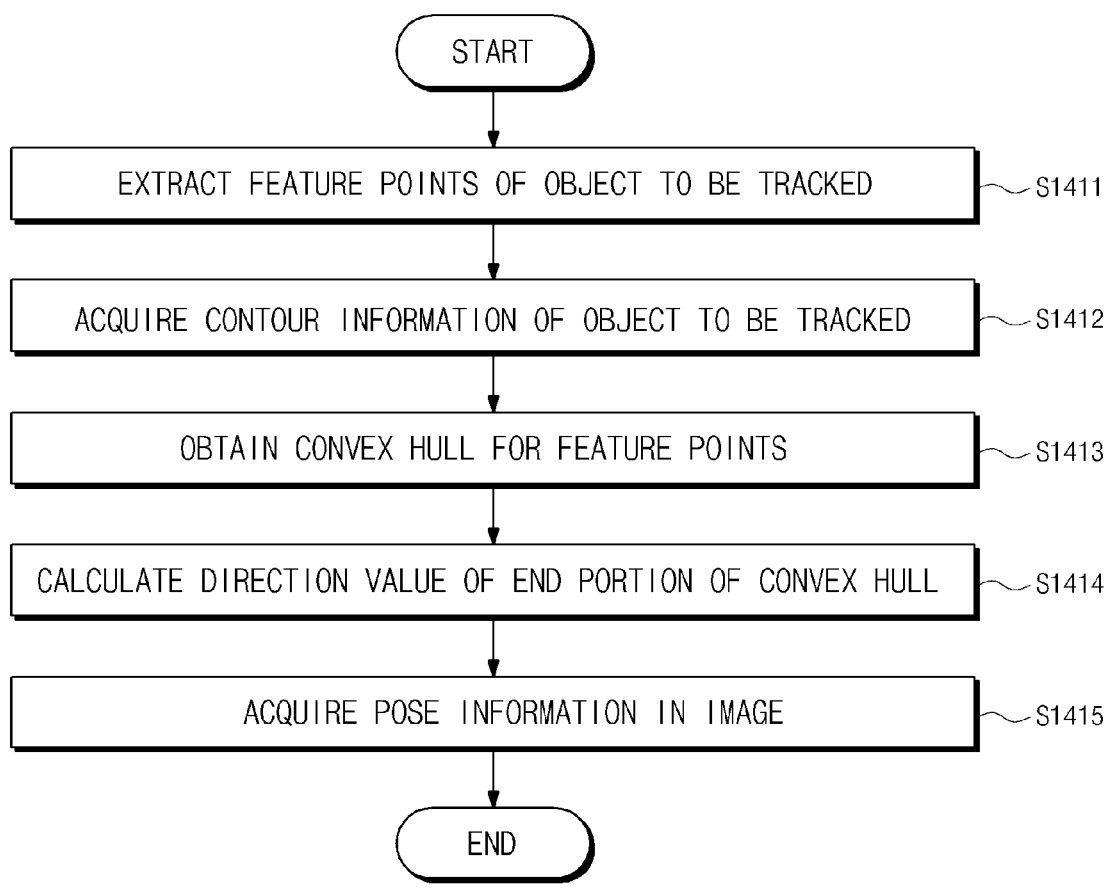
FIG. 10 is a flowchart illustrating a method of acquiring pose information of an object to be tracked.

First, acquisition of the pose information of each of the first, second and third objects 11, 12 and 13 from the image, according to an embodiment of the present invention will be described with reference to FIGS. 10 and 11A through 11D. FIG. 10 is a flowchart illustrating a method of acquiring pose information of each of the first, second and third objects 11, 12 and 13. FIGS. 11A through 11D are views for explaining the method of acquiring pose information of each of the first, second and third objects 11, 12 and 13.

Referring to FIG. 10, first, feature points F of each of the first, second and third objects 11, 12 and 13 are extracted to estimate pose information of each of the first, second and third objects 11, 12 and 13 (operation S1411). In this case, the feature points F of each of the first, second and third objects 11, 12 and 13, extracted in operation S1100, which is a displacement measurement process, may be reused. If the displacement of each object is measured in operation S1100 without extracting the feature points F of each object, extraction of the feature points F of each object may be performed in the same manner as or similarly to the above description.

As a result, as illustrated in FIG. 11A, a plurality of feature points F for each of the first, second and third objects 11, 12 and 13 may be obtained.

Figure 11B:
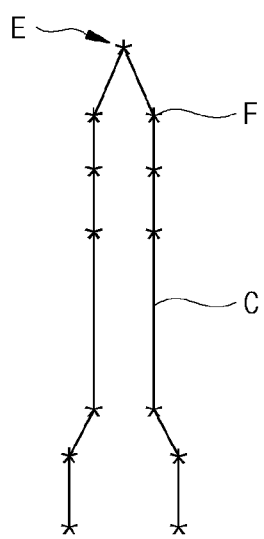

Subsequently, at least one contour c of each of the first, second and third objects 11, 12 and 13 may be obtained using the obtained feature points F of each object (operation S1412). By way of example, as illustrated in FIG. 11B, the contour C may be obtained by connecting adjacent ones of the plurality of feature points F by a segment, such as a predetermined straight line, a curve, or the like.

Figure 11C:
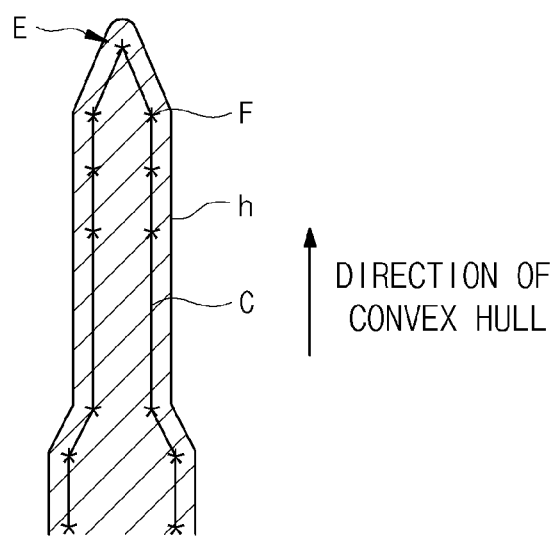

After obtaining the contour c of each object, as illustrated in FIG. 11C, a convex hull h of each object may be obtained through calculation (operation S1413).

Mathematically, the term "convex" as used herein indicates that all points on a segment connecting two arbitrary points in a predetermined region are included in the predetermined region. The convex hull h may refer to a geometrical figure such as a polygon, a circle, an oval, or the like having a plurality of convex points. Thus, the convex hull h obtained in operation S1413 may refer to a geometrical figure containing the contour C. For example, the convex hull h obtained in operation S1413 may refer to a segment connecting at least two feature points F on each of the first, second and third objects 11, 12 and 13, i.e., the contour C. The convex hull h as illustrated in FIG. 11C may be obtained using the contour C as illustrated in FIG. 11B. To obtain the convex hull h, calculation using a Graham Scan algorithm may be performed. In addition, various algorithms or mathematical methods for calculation of the convex hull h may also be used.

Next, a central point of the obtained convex hull h is obtained, and a direction of the convex hull h is calculated. In this case, the central point of the convex hull h may be calculated using moments of all points constituting the convex hull h (operation S1414). In addition, an end portion E of the convex hull h may also be calculated using the moments of all the points constituting the convex hull h. The calculated central point and end portion E of the convex hull h may be used to obtain a direction of the convex hull h. In some embodiments, the direction of the convex hull h may be directly calculated without calculating the central point and end portion E of the convex hull h.

Figure 11D:
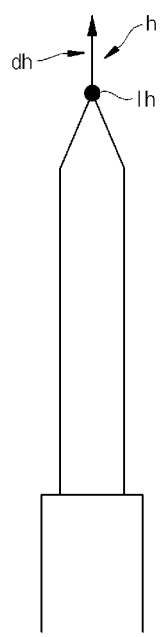

Finally, as illustrated in FIG. 11D, information on a direction dh of the convex hull h and a location lh of the end portion E thereof may be acquired.

The location lh of the end portion E of the convex hull h or the direction dh of the convex hull h may correspond to a location of the end portion E of each of the first, second and third objects 11, 12 and 13 or a direction of each object. Therefore, the pose information of each object may be acquired from the image thereof (operation S1415).

Although the previous embodiment has described that the pose information acquisition process is performed after the particle setting process (operation S1200), the pose information acquisition process may be performed in combination with the particle setting process (operation S1200). In addition, the pose information acquisition process may be performed before the particle setting process (operation S1200).

By using the acquired pose information in the image, a pose estimated by each of the first, second and third particles P1, P2 and P3, e.g., a position and direction of the end portion E of each object, may be evaluated. In this case, for evaluation of each of the first, second and third particles P1, P2 and P3, a weight for each particle may be calculated (operation S1320).

The weight for each particle may be obtained using Equation 4 below:

$$\omega = \lambda * \omega_p * (1-\lambda) * \omega_o \qquad \text{[Equation 4]}$$

wherein $\omega_p$ denotes a weight for a position, and $\omega_o$ denotes a weight for a direction, and $\lambda$ is a coefficient determined according to which is more emphasized between position and direction weights $\omega_p$ and $\omega_o$. In this regard, the coefficient $\lambda$ may be pre-defined by a system designer or the like of the control apparatus for tracking a moving object, selected by a user, or determined by the tracking unit 40 of the control apparatus according to separate standards.

In one embodiment, to obtain the weight for each of the first, second and third particles P1, P2 and P3, a likelihood of an estimate of each particle may be calculated by applying random noise to the acquired pose information of each of the first, second and third objects 11, 12 and 13 contained in the image thereof and modeling the random noise-applied pose information according to predetermined distribution, e.g., Gaussian distribution, thereby determining the weight for each particle. In this case, the position and direction weights $\omega_p$ and $\omega_o$ may be separately determined.

When each weight $\omega$ for each particle is calculated, an estimated pose for each of the first, second and third objects 11, 12 and 13 may be determined using each particle p and each weight $\omega$ to track the first, second and third objects 11, 12 and 13 (operation S1330).

In this case, the poses of the first, second and third objects 11, 12 and 13 may be determined or the first, second and third objects 11, 12 and 13 may be tracked by selecting optimum particles among the plurality of particles P or calculating and obtaining separate particles P.

In particular, pose determination or tracking of the first, second and third objects 11, 12 and 13 may be performed using various methods based on each particle P and each weight ω.

For example, if it is determined that one of the particles P that has the greatest weight ω estimates a current pose of each of the first, second and third objects 11, 12 and 13 best, the particle P with the greatest weight ω is selected, and the selected particle P is used to estimate the pose of each object or track each object.

Alternatively, or additionally, each weight ω may be applied to each particle P to obtain weighted sums and an average of the weighted sums for the particles P may be calculated to obtain a weight-averaged particle for the particles P, and the weight-averaged particle may be used to estimate the poses of the first, second and third objects 11, 12 and 13 or to track the first, second and third objects 11, 12 and 13. The weight-averaged particle may be a particle estimating the same location as a weight-averaged location which is an average of the weight-applied positions of the first, second and third objects 11, 12 and 13 estimated by each particle, and/or may be a particle estimating the same direction as a weight-averaged direction, which is an average of the weight-applied directions of the first, second and third objects 11, 12 and 13 estimated by each particle. In this case, a particle p that most closely approximates to the weight-averaged particle, among the plurality of particles P, may be used.

Alternatively, or additionally the weight-averaged particle may be obtained by selecting particles P, each weight ω of which is within a certain range or exceeds a predetermined value and by calculating an average of the weights of the selected particles P, and the obtained weight-averaged particle may be used to estimate the poses of the first, second and third objects 11, 12 and 13 and to track each object. Similarly to the above description, a particle P that most closely approximates to the weight-averaged particle, among the plurality of particles P, may be used.

Alternatively, or additionally a certain number of particles may be selected in the order of the magnitude of each weight ω, a weight-averaged particle corresponding to an average of the weights of the selected particles P may be obtained, and the obtained weight-averaged particle may be used to estimate the poses of the first, second and third objects 11, 12 and 13 and to track the first, second and third objects 11, 12 and 13. Similarly, particles P that approximate to the weight-averaged particle, among the plurality of particles P, may be selected and used to estimate the poses of the first, second and third objects 11, 12 and 13 and to track the first, second and third objects 11, 12 and 13.

Alternatively, or additionally an average of all the particles P or some selected particles P may be calculated regardless of each weight ω to obtain an average particle P and the obtained average particle may be used for estimation of the poses of the first, second and third objects 11, 12 and 13 or for tracking each object.

Figure 12:
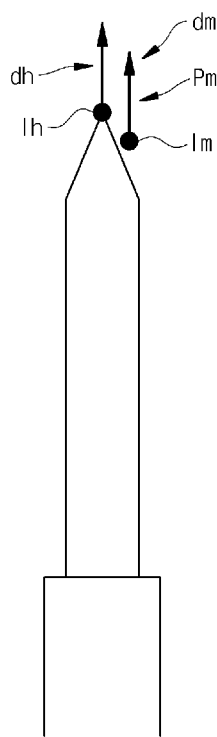
FIG. 12 is a view for explaining an example of estimation of an object to be tracked using particles by applying a weight thereto.

By using the above-described methods, as illustrated in FIG. 12, a predetermined resulting particle $P_m$, e.g., a selected particle, a weight-averaged particle, or an average particle, may be obtained.

FIG. 12 is a view for explaining an example of estimation of each object to be tracked, using particles, by applying a weight thereto.

As illustrated in FIG. 12, the resulting particle $P_m$ is a particle estimating a particular location of each of the first, second and third objects 11, 12 and 13, e.g., a position or direction of the end portion of each object or a direction of each object. Thus, such information may not necessarily coincide with the above-described pose information of the first, second and third objects 11, 12 and 13, e.g., information on the direction dh of each object or the location lh of the end portion thereof, acquired through the convex hull h. However, the resulting particle $P_m$ that approximates to the pose information of each object may be obtained through the above-described method. In some cases, the resulting particle $P_m$ may completely coincide with the pose information of each object.

Thus, the obtained resulting particle $P_m$ contains estimated information regarding each of the first, second and third particles 11, 12 and 13 or a portion of each object, e.g., the end portion of each object, and thus, each of the first, second and third particles 11, 12 and 13 or a portion of each object, e.g., the end portion of each object, may be appropriately estimated using the resulting particle $P_m$. In addition, each of the first, second and third particles 11, 12 and 13 or a portion of each object may be appropriately tracked according to estimation results.

In FIG. 12, only a single resulting particle $P_m$ for each object is illustrated. In some embodiments, however, a plurality of resulting particles $P_m$ may be obtained. In addition, a separate order may be further added as additional information according to determination results of the proximity between each resulting particle $P_m$ and the pose information of each object.

In some embodiments, a separate image of the first, second and third objects 11, 12 and 13 may be further produced based on the appropriately estimated resulting particle $P_m$. The separate image of the first, second and third objects 11, 12 and 13 may be displayed on the above-described display unit d. A user using the control apparatus may more easily perform control of the first, second and third objects 11, 12 and 13 with reference to the image generated by the imaging module 30 and the separate image thereof displayed on the display unit d.

In addition, internal problems of the control apparatus that drives the first, second and third objects 11, 12 and 13, e.g., difficulties in visual recognition as the first, second and third objects 11, 12 and 13 get smaller in size, difficulties in location determination of the first, second and third objects 11, 12 and 13 due to errors according to delay in image processing time or image transmission time, and the like may be addressed using the above-described methods. Moreover, the control apparatus may provide user convenience.

In the moving object tracking method according to an embodiment, all or some of the particles P obtained in the particle setting process (operation S1200) may be separately extracted to reset (or reselect) the particles P. The particles P reset (or reselected) in a particle resetting process may be used for calculation of another resulting particle $P_m$, independently from calculation of the above-described resulting particle $P_m$.

The particle resetting process may be performed after, for example, the above-described particle weight calculation process (operation S1320), or after the calculation of the resulting particle $P_m$, i.e., operation S1330. In addition, the particle resetting process may be performed after other processes as desired.

In an embodiment, the particle resetting process may be performed by extracting only particles having a weight ω within a certain range, selected from among the plurality of particles P. For example, the particles P may be reset by removing particles having low weights ω and extracting or keeping only particles having high weights ω. Alternatively, for example, particles having a weight less than a first threshold but greater than a second threshold may be kept.

For example, only particles determined according to the order of the magnitude of the weight ω may be extracted from the plurality of particles P or kept, or only particles having weights ω that are greater than a predetermined value may be extracted or kept.

In addition, the particle resetting process may be performed by randomly extracting a certain number of arbitrary particles from among the plurality of particles P.

In addition, particles having weights ω that are greater than a predetermined value may be extracted from among the plurality of particles P and only some of the extracted particles may be further extracted using the above-described method. In addition, various methods, such as resetting of particles by extraction of all of or only some of the particles P may be used.

The reset particles P may be stored in the particle storage unit 41. The particles P stored in the particle storage unit 41 may be called when the tracking unit 40 repeats a method of tracking a new moving object. For example, when the particle setting process (operation S1200) for the first, second and third objects 11, 12 and 13 is performed, at least one particle of each object may be generated and set, or the reset particles P may be called from the particle storage unit 41 and used as particles P for each object. In this case, some of the particles P for each object may be generated and the reset particles P called from the particle storage unit 41 may be used as the remaining particles P.

When the particle resetting process is performed, good particle filtering performance may be maintained and a separate particle calculation process may not be partially performed, which results in increased processing rate and a decrease in required resources.

The particle resetting process may be performed using the particles P and weights ω therefor, independently from a process of tracking the first, second and third objects 11, 12 and 13 (operation S1300). When the particle resetting process is performed independently from operation S1300, the particle resetting process may be performed as illustrated in FIG. 13.

Figure 13:
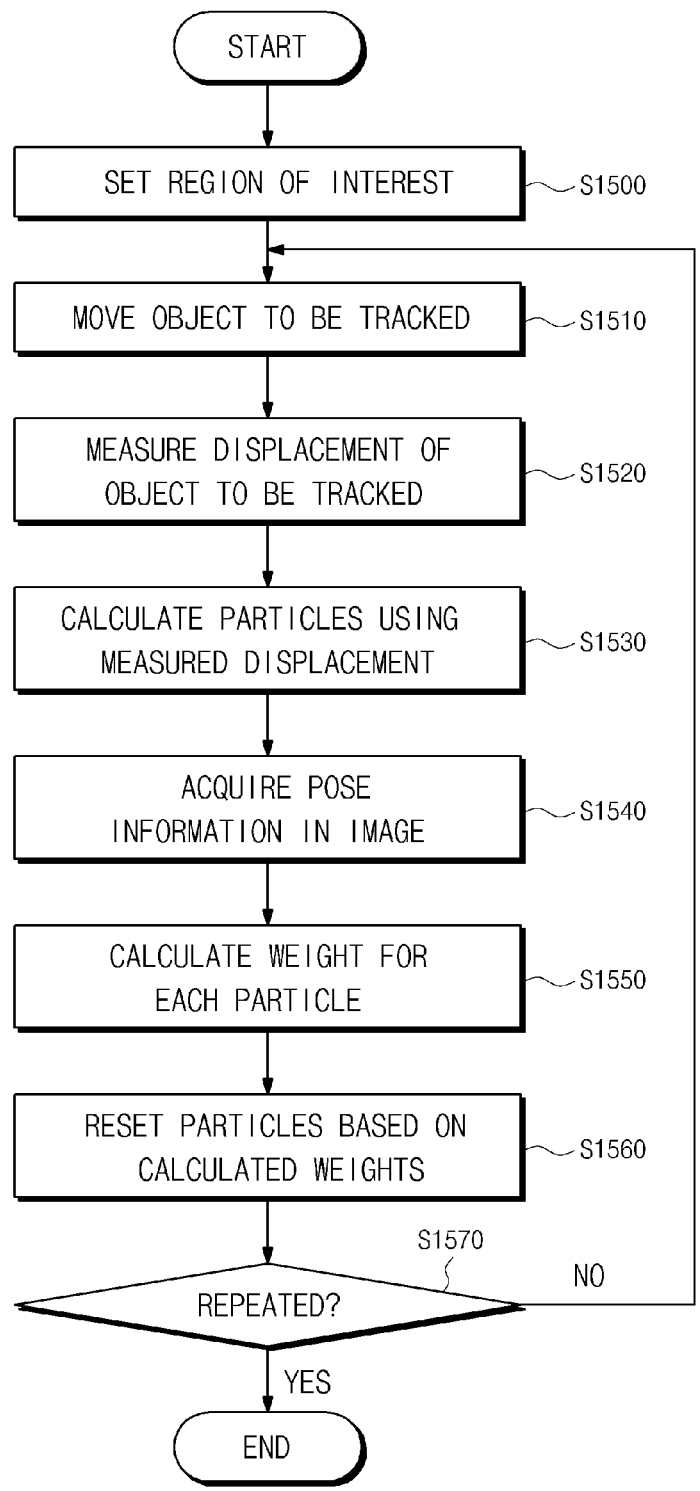
FIG. 13 is a flowchart illustrating a particle resetting process according to an embodiment of the present invention.

FIG. 13 is a flowchart illustrating a particle resetting process according to an embodiment of the present invention.

In particular, according to the particle resetting process illustrated in FIG. 13, first, a region of interest in an image is set according to user selection or predefined settings (operation S1500).

When the first, second and third objects 11, 12 and 13 within the set region of interest move (S1510), displacements $\Delta u$ of the first, second and third objects 11, 12 and 13 are measured (operation S1520). The displacement $\Delta u$ of each object may be calculated using feature points of the corresponding object as described above.

Post-movement particles P of each object are calculated and set using the measured displacement $\Delta u$ thereof (operation S1530). In this case, calculation of the post-movement particles P of each object may be performed, for example, using Equation 2 or 3 above. In addition, the post-movement particles P of each object may be calculated using displacement $\Delta u$ of the corresponding object measured using other methods.

Next, pose information of the first, second and third objects 11, 12 and 13 may be acquired from an image thereof (operation S1540). Acquisition of the pose information thereof may be performed after the above-described particle setting process (operation S1530) or in combination with operation S1530. In addition, the acquisition of the pose information may be performed before operation S1530.

When the pose information of the first, second and third objects 11, 12 and 13 is calculated, a weight ω for each particle P may be calculated according to the calculated pose information (operation S1550). In this case, calculation of the weight ω for each particle P may be performed using Equation 4 above.

The particles P may be reset based on the calculated weight ω (operation S1560). For example, as described above, all or some of the particles P may be extracted according to the weight ω.

In addition, as described above, the obtained feature points F of each of the first, second and third objects 11, 12 and 13 may be further used to determine whether or not the first, second and third objects 11, 12 and 13 in the image thereof are outside or within a screen of the display unit d.

The first, second and third objects 11, 12 and 13 may be in one of three states in the image captured by the imaging module 30.

A first state may refer to an all display state in which all of the first, second and third objects 11, 12 and 13 are displayed on the captured image. In this state, all feature points F of each of the first, second and third objects 11, 12 and 13 may be observed in the image. That is, the number of feature points F to be extracted corresponds to the number of the feature points F of the first, second and third objects 11, 12 and 13.

A second state may refer to a partial display state in which the first, second and third objects 11, 12 and 13 are partially displayed in the captured image. In this state, only some of the first, second and third objects 11, 12 and 13 may be detected in the image. When considerably large portions of the first, second and third objects 11, 12 and 13 are displayed in the image, a greater number of the feature points F, among the feature points F of the first, second and third objects 11, 12 and 13, may be detected in the image. On the contrary to this, when relatively small portions of the first, second and third objects 11, 12 and 13 are displayed in the image, a smaller number of the feature points F, among the feature points F of the first, second and third objects 11, 12 and 13, may be detected in the image.

For example, the number of the detected feature points F may be in direct proportion to the sizes of the first, second and third objects 11, 12 and 13 partially displayed in the image on the precondition that the feature points F are ideally extracted.

A third state may refer to a non-display state in which the first, second and third objects 11, 12 and 13 are not displayed in the captured image at all. In this state, it is impossible to detect any feature points F of the first, second and third objects 11, 12 and 13. That is, the number of the extracted feature points F is 0 or a value that approximates to 0.

As described above, it may be determined whether the first, second and third objects 11, 12 and 13 are displayed in the captured image using the number of the feature points F extracted from the image or a ratio $R_f$ of extracted feature points F to the total feature points F.

In a method of determining the display state of the first, second and third objects 11, 12 and 13 in the captured image or transition of the display states thereof, according to an embodiment of the present invention, it may be determined whether the first, second and third objects 11, 12 and 13 are displayed in the captured image using the number of feature points F displayed in the image.

For this operation, first, feature points F of each of the first, second and third objects 11, 12 and 13 in the image are obtained. In this case, the feature points F extracted in operation S1110 may also be used. In addition, the feature points F may be extracted from the first, second and third objects 11, 12 and 13 through a separate process independently from operation S1110. In addition, the feature points F extracted in operation S1110 may be used for some of the feature points F, and some other of the feature points F may be extracted from the first, second and third objects 11, 12 and 13 independently from operation S1110.

The number of extracted feature points F may be compared with two predetermined threshold values $T_{c1}$ and $T_{c2}$ of the number of tracked feature points.

If the number of the feature points F is greater than the threshold value $T_{c1}$ of the number of tracked feature points, it may be determined that all of the first, second and third objects 11, 12 and 13 are displayed in the image. If the number of the feature points F is below than the threshold value $T_{c1}$ of the number of tracked feature points while being above the other threshold value $T_{c2}$ of the number of tracked feature points, it may be determined that the first, second and third objects 11, 12 and 13 are partially displayed in the image (i.e., a partial display state or transition to the partial display state). On the contrary to this, if the number of the feature points F is below the threshold value $T_{c2}$ of the number of tracked feature points (and also below the threshold value $T_{c1}$), it may be determined that the first, second and third objects 11, 12 and 13 are not displayed in the image at all (i.e., a non-display state or transition to the non-display state).

In this regard, a threshold value $T_c$ of the number of tracked feature points may be predefined by a system designer or selected by a user. In addition, the threshold value $T_c$ may be a resulting value optimally calculated by the control apparatus according to a surrounding environment.

In another embodiment, the display state of the first, second and third objects 11, 12 and 13 in the image or transition of the display states thereof may be determined using a ratio $R_t$ of extracted featured points $F_s$ to total feature points $F_{total}$, i.e., a tracked feature point ratio.

For example, first, the feature points F of the first, second and third objects 11, 12 and 13 are extracted from the image, and the ratio $R_t$ of extracted featured points $F_s$ to total feature points $F_{total}$ is calculated.

The calculated tracked feature point ratio $R_t$ may be compared with a threshold value $T_t$ of the tracked feature point ratio.

If the tracked feature point ratio $R_t$ is less than the threshold value $T_t$ of the tracked feature point ratio, it may be determined that the display state of the first, second and third objects 11, 12 and 13 is changed to a state in which the first, second and third objects 11, 12 and 13 are partially displayed in the image (i.e., a partial display state or transition to the partial display state). On the other hand, if the tracked feature point ratio $R_t$ exceeds the threshold value $T_t$ of the tracked feature point ratio, it may be determined that the display state of the first, second and third objects 11, 12 and 13 is changed to a state in which all of the first, second and third objects 11, 12 and 13 are displayed in the image (i.e., an all display state or transition to the all display state). Alternatively, if the tracked feature point ratio $R_t$ is zero or approximate to zero, then it may be determined that the display state of the first, second and third objects 11, 12 and 13 is changed to a non-display state. Alternatively, two threshold values may be used. For example, if the tracked feature point ratio $R_t$ is greater than a threshold value $T_{t1}$ of the tracked feature point ratio, then it may be determined that the display state is an all display state. If the tracked feature point ratio $R_t$ is less than the threshold value $T_{t1}$ of the tracked feature point ratio, but greater than a threshold value $T_{t2}$ then it may be determined that the display state is a partial display state. And if the tracked feature point ratio $R_t$ is less than the threshold values $T_{t1}$ and $T_{t2}$ then it may be determined that the first, second and third objects 11, 12 and 13 are not displayed in the image at all (i.e., a non-display state or transition to the non-display state).

The threshold value $T_t$ of the tracked feature point ratio may be predefined by a system designer or selected by a user. In addition, the threshold value $T_t$ may be a resulting value optimally calculated by the control apparatus according to surrounding environment.

In another embodiment, the display state of the first, second and third objects 11, 12 and 13 on the image or transition of the display state thereof may be determined using a matching ratio between feature points detected from the region of interest set in the above-described region-of-interest setting process and feature points contained in the captured image.

For example, first, the feature points F of the first, second and third objects 11, 12 and 13 are extracted from the image, and the extracted feature points F may be matched with feature points $F_{region}$ detected from the region of interest to calculate a feature point matching ratio $R_f$.

The calculated feature point matching ratio $R_f$ may be compared with a threshold value Tf of the feature point matching ratio $R_f$. In this case, the threshold value Tf of the feature point matching ratio $R_f$ may be predefined by a system designer or selected by a user. In addition, the threshold value Tf may be a resulting value optimally calculated by the control apparatus according to surrounding environments.

If the calculated feature point matching ratio $R_f$ is below the threshold value Tf of the feature point matching ratio $R_f$, it may be determined that the first, second and third objects 11, 12 and 13 are not displayed in the image at all or the display state thereof is changed to a barely displayed state (i.e., a non-display state or transition to the non-display state). On the other hand, if the calculated feature point matching ratio $R_f$ exceeds the threshold value Tf of the feature point matching ratio $R_f$, it may be determined that the display state of the first, second and third objects 11, 12 and 13 is changed to an all display state (i.e., an all display state or transition to the all display state). Alternatively, two threshold values may be used. For example, if the feature point matching ratio $R_f$ is greater than a threshold value $T_{f1}$ of the feature point matching ratio, then it may be determined that the display state is an all display state. If the feature point matching ratio $R_f$ is less than the threshold value $T_{f1}$, but greater than a threshold value $T_{f2}$ then it may be determined that the display state is a partial display state. And if the feature point matching ratio $R_f$ is less than the threshold values $T_{f1}$ and $T_{f2}$ then it may be determined that the first, second and third objects 11, 12 and 13 are not displayed in the image at all (i.e., a non-display state or transition to the non-display state).

In another embodiment, the display state of the first, second and third objects 11, 12 and 13 or whether or not the display state thereof is changed may be determined using movement amounts (i.e., displacements) of the feature points F.

In this regard, the display state of the first, second and third objects 11, 12 and 13 or whether or not the display state thereof is changed may be determined by calculating the displacements $\Delta u$ of the feature points F using Equation 1 above and comparing the calculated displacements $\Delta u$ thereof with a threshold value $T_u$ of the displacements $\Delta u$ of the feature points F. In this regard, the displacements $\Delta u$ of the feature points F may be an average of the displacements $\Delta u$ of the feature points F.

If the calculated displacements $\Delta u$ exceed the threshold value $T_u$ of the displacements $\Delta u$ of the feature points F after the first, second and third objects 11, 12 and 13 move in a non-display state, it may be determined that the display state of the first, second and third objects 11, 12 and 13 is changed from the non-display state to a partial display state (i.e., a partial display state or transition to the partial display state.

The display state of the first, second and third objects 11, 12 and 13 in the image or whether or not the display state thereof is changed may be determined using one of the above-described methods alone or in combination of at least two of the above-described methods.

For example, when the display state of the first, second and third objects 11, 12 and 13 is an all display state, it may be determined whether or not the display state thereof is changed from the all display state to a partial display state by comparing the tracked feature point ratio $R_t$ with the threshold value $T_t$ of the tracked feature point ratio.

In this case, if the tracked feature point ratio $R_t$ is below the threshold value $T_t$ of the tracked feature point ratio, it may be determined that the display state of the first, second and third objects 11, 12 and 13 is changed to a partial display state.

When the display state of the first, second and third objects 11, 12 and 13 is a partial display state, it may be determined whether or not the display state thereof is changed from the partial display state to a non-display state by comparing the feature point matching ratio $R_f$ with the threshold value Tf of the feature point matching ratio $R_f$.

In this case, if the feature point matching ratio $R_f$ is below the threshold value Tf of the feature point matching ratio $R_f$, it may be determined that the display state of the first, second and third objects 11, 12 and 13 is changed to a non-display state.

In addition, when the display state of the first, second and third objects 11, 12 and 13 is a non-display state, it may be determined whether or not the display state thereof is changed from the non-display state to a partial display state by comparing an average of the displacements Δu of the feature points F and the threshold value $T_u$ of the displacements Δu of the feature points F.

For example, if the average of the displacements Δu of the feature points F exceeds the threshold value $T_u$ of the displacements Δu of the feature points F, it may be determined that the display state of the first, second and third objects 11, 12 and 13 is changed from the non-display state to a partial display state.

When the display state of the first, second and third objects 11, 12 and 13 is a partial display state, it may be determined whether or not the display state thereof is changed from the partial display state to an all display state by comparing the feature point matching ratio $R_f$ with the threshold value Tf of the feature point matching ratio $R_f$.

For example, if the feature point matching ratio $R_f$ exceeds the threshold value Tf of the feature point matching ratio $R_f$, it may be determined that the display state thereof is changed from the partial display state to an all display state.

Hereinafter, a surgical robot according to an embodiment of the present invention using the above-described moving object tracking method will be described with reference to FIGS. 14 to 23.

Figure 14:
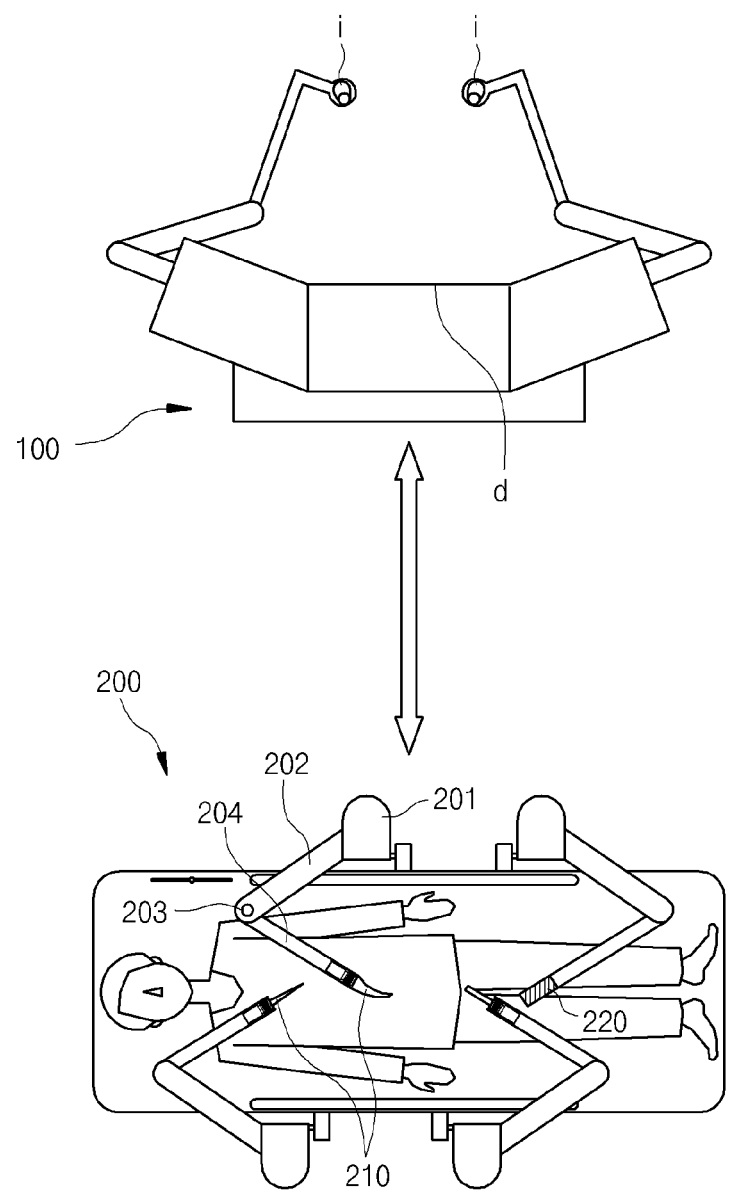
FIG. 14 is a view of a surgical robot according to an embodiment of the present invention.
Figure 15:
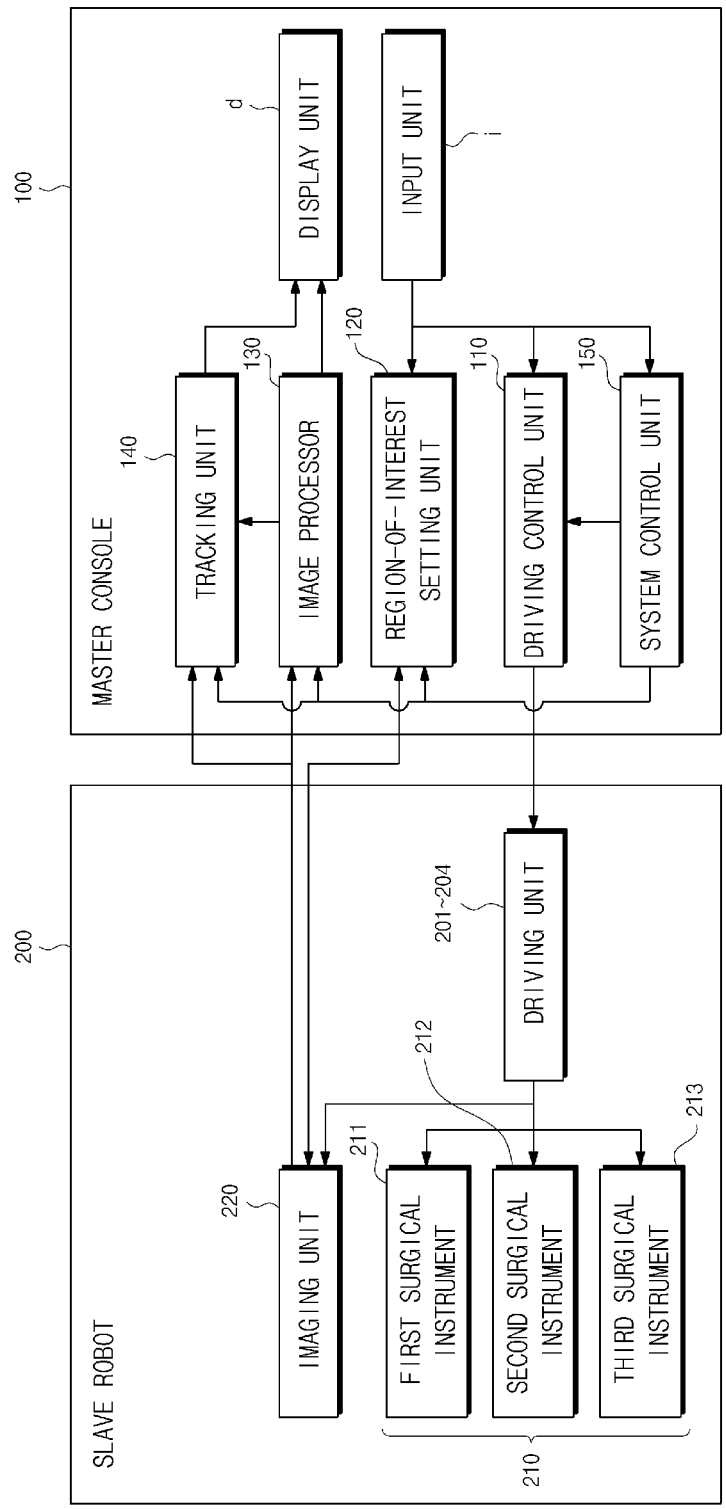
FIG. 15 is a block diagram illustrating the configuration of the surgical robot according to the embodiment of the present invention.

FIG. 14 is a view of a surgical robot according to an embodiment of the present invention. FIG. 15 is a block diagram illustrating the configuration of the surgical robot according to an embodiment of the present invention.

The surgical robot illustrated in FIG. 14 is a surgical robot including a plurality of robotic surgical instruments to enter the abdomen of a patient through a single incision or a plurality of incisions and perform a surgery in a non-open state. The surgical robot may be a single port surgical robot or a multi-port surgical robot. The single port surgical robot may refer to a surgical robot including a surgical instrument to enter the interior of the abdomen through a single incision, and the multi-port surgical robot may refer to a surgical robot including a plurality of surgical instruments to enter the interior of the abdomen through the respective incisions.

As illustrated in FIGS. 14 and 15, the surgical robot may include a master console 100 and a slave robot 200. The master console 100 generates a control signal according to a user's operation and transmits the control signal to the slave robot 200. The slave robot 200 receives the control signal from the master console 100 and is driven and operates according to the received control signal to perform manipulation needed for a surgery of a patient.

As illustrated in FIG. 15, the master console 100 may include the input unit i, a driving control unit 110, a region-of-interest setting unit 120, an image processor 130, a tracking unit 140, a system control unit 150, and the display unit d.

The input unit i receives manipulation commands for control of operations of surgical instruments 210 input by a user. As illustrated in FIG. 14, the input unit i may include at least one of a haptic device, a clutch pedal, various switches and buttons, and a touch screen. In addition, as desired, the input unit i may include various input members for control of the surgical instruments 210 of the slave robot 200. According to embodiments, the input unit i may also include input members, such as a stick, a lever, handles, a voice recognition device, keys, a joystick, a keyboard, a mouse, and the like to enable a user to manipulate objects to be tracked and/or to control the surgical robot using the input unit i. The input unit i may include all or only some of the above-described input members.

When the input unit i includes a haptic device, the input unit i may include an end effector to allow a user to perform manipulation and a support unit that is mechanically connected to the end effector and supports wrists or the like of a user. The end effector may include, for example, multi-joint robotic fingers.

The input unit i may generate a predetermined driving force or a predetermined electric signal according to a user's operation and transmits the driving force or the electric signal to the driving control unit 110 or driving units 201, 202, 203 and 204.

The driving control unit 110 may generate a predetermined control signal according to the electric signal or driving force related to the user's operation that is transmitted by the input unit i and transmits the generated control signal to the driving units 201, 202, 203 and 204 of the slave robot 200. For this operation, the driving control unit 110 may include a wired or wireless communication module, or combination thereof.

The region-of-interest setting unit 120 sets a region of interest in an image generated by an imaging unit 220 or the image processor 130 of the slave robot 200 according to predefined settings or a user's operation input through the input unit i. In this regard, the region of interest may refer to a predetermined region set in an image containing the surgical instruments 210 to be tracked. The region of interest set by the region-of-interest setting unit 120 may be the entire region or a partial region of the image generated by the imaging unit 220 or the image processor 130. The image used to set the region of interest may be raw image data captured and generated by the imaging unit 220 and/or an image generated or corrected by the image processor 130.

The region-of-interest setting unit 120 may set the region of interest according to information input by a user through the input unit i, through matching feature points of the surgical instruments 210 contained in the image, or using kinematic information of the surgical instruments 210.

The image processor 130 generates an image, e.g., an endoscopic image, using the image generated by the imaging unit 220 of the slave robot 220 or raw data transmitted by the imaging unit 200 or performs predetermined image processing of the generated image. In some embodiments, the image processor 130 may correct contrast, brightness, sharpness, or the like of all or some of the raw image data or the entire region or a partial region of the corrected image. In addition, the image processor 130 may change image resolution or perform a conversion process. Moreover, the image processor 130 may generate a stereoscopic image.

The image generated by the image processor 130 may be stored in a separate memory device (not shown) or displayed to a user via the display unit d.

The tracking unit 140 tracks the surgical instruments 210 using an image generated or corrected by the imaging unit 220 or the image processor 130. In addition, the tracking unit 140 may determine a display state of an object to be tracked. This will be described below in detail.

The system control unit 150 controls overall operations of the master console 100 based on commands or instructions input by a user via the input unit i, predefined settings, or the like.

In addition, as illustrated in FIGS. 14 and 15, the slave robot 200 may include the driving units 201, 202, 203 and 204, the surgical instruments 210, and the imaging unit 220.

The driving unit 201 receives a predetermined control signal from the driving control unit 110 and is driven according to the predetermined control signal so as to operate in accordance with a user's demands or predetermined settings.

In particular, the driving unit 201 may include a first joint unit 201 installed at and fixed to an operation table, a robot arm 202 connected to the first joint unit 201, a direction of which is changed by the first joint unit 201, a second joint unit 203 installed at an end portion of the robot arm 202, another robot arm 204 connected to the second joint unit 203 and a surgical instrument 210 connected to the end of the another robot arm 204. Each of the first and second joint units 201 and 203 rotates in at least one direction to enable the surgical instrument 210 to appropriately reach an affected site of a patient. With reference to FIG. 1, there may be multiple driving units which correspond respectively to objects or surgical instruments to be tracked. Thus each driving unit may include a first joint unit installed at and fixed to an operation table, a first robot arm connected to the first joint unit, a direction of which is changed by the first joint unit, a second joint unit installed at an end portion of the first robot arm, a second robot arm connected to the second joint unit and a surgical instrument connected to the end of the second robot arm. However, the disclosure is not so limited, and a driving unit may include only one joint unit and one robot arm, or may include more than two joint units and more than two robot arms. Further, more than one robot arm may be attached to a single joint unit.

The surgical instrument 210 may be provided at an end portion of the driving unit (e.g., the second robot arm) with various surgical instruments 210 fixed thereto or detachably coupled therewith to perform surgical operations upon the affected site of a patient. Examples of the surgical instruments 210 include a skin holder, a suction line, a mes, scissors, a cutting blade, a needle holder, and various other surgical instruments. As illustrated in FIGS. 14 and 15, the slave robot 200 may includes the surgical instruments 210, i.e., first, second and third surgical instruments 211, 212 and 213.

The slave robot 200 may further include the imaging unit 220 to perform imaging of a site (i.e., an affected site) of a patient put under surgery by the surgical instruments 210.

The imaging unit 220 may be, for example, an endoscope, and may include various surgical endoscopes, such as a thoracoscope, an arthroscope, a rhinoscope, a cysotoscope, a rectoscope, a duodenoscope, and a cardioscope, in addition to a laparoscope that is generally used in robotic surgery.

When the endoscope is used as the imaging unit 220, the imaging unit 220 may also be introduced into a human body through a predetermined incision. Accordingly, even when the first, second and third surgical instruments 211, 212 and 213 operate in a particular location of the interior of the human body, which is difficult to be directly recognized by human eyes, an endoscopic image of the first, second and third surgical instruments 211, 212 and 213 may be acquired. The endoscope may acquire an image of the interior of the human body using a charge-coupled device (CCD). The endoscope may be inserted and controlled using a driving unit. That is, the endoscope or imaging unit may be attached to an end of a robot arm similar to or in the same manner as a surgical instrument.

Figure 16:
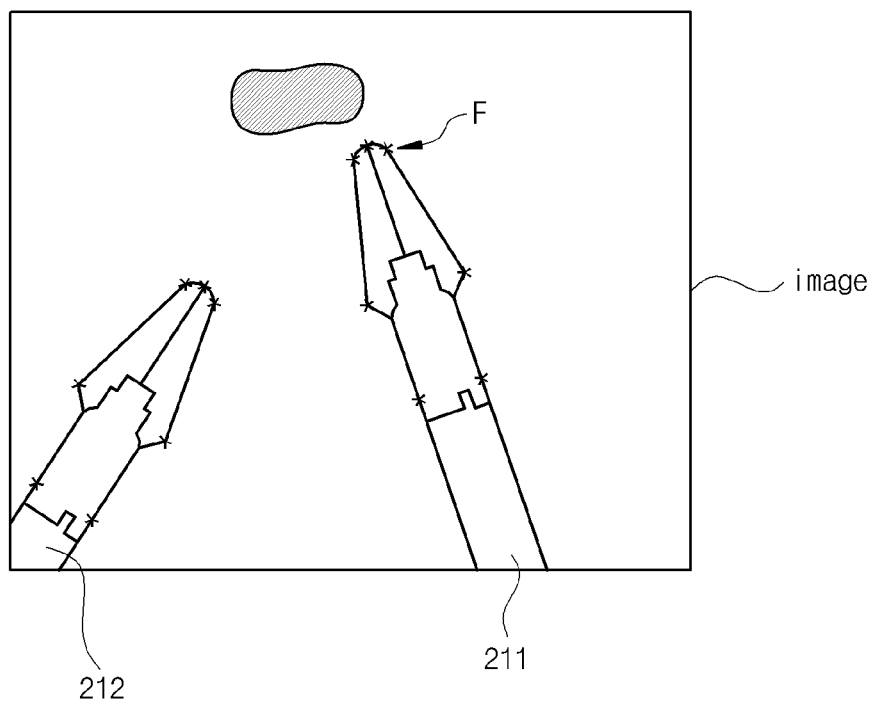
FIG. 16 is a view of an image captured by an endoscope.

FIG. 16 is a view of an image captured by an endoscope.

The imaging unit 220 performs imaging of the first, second and third surgical instruments 211, 212 and 213 when it is inserted through a incision together with the first, second and third surgical instruments 211, 212 and 213. The imaging unit 220 may collect raw data of a predetermined electric signal and may generate a predetermined image as illustrated in FIG. 16 based on the collected raw data. In another embodiment, the imaging unit 220 may not directly generate an image, and the image processor 130 of the master console 100 may generate an image of the first, second and third surgical instruments 211, 212 and 213 as illustrated in FIG. 16 by receiving the raw data collected by the imaging unit 220.

The image generated by the imaging unit 220 or the image processor 130 is transmitted to the tracking unit 140. The tracking unit 140 measures displacements of the first and second surgical instruments 211 and 212 based on the image generated by the imaging unit 220 or the image processor 130 as illustrated in FIG. 16. First, the tracking unit 140 may extract feature points F of the first and second surgical instruments 211 and 212, which are distinguished from other objects, e.g., other surgical instruments, an affected site of a patient, various internal organs of a human body, or the like, from the image of the first and second surgical instruments 211 and 212 as illustrated in FIG. 16. Such feature points F may be placed on a tool tip of the first surgical instrument 211, various edges, corners, fasteners, boundary surfaces, and protrusions of the first, second and third surgical instruments 211, 212 and 213, or the like.

Figure 17:
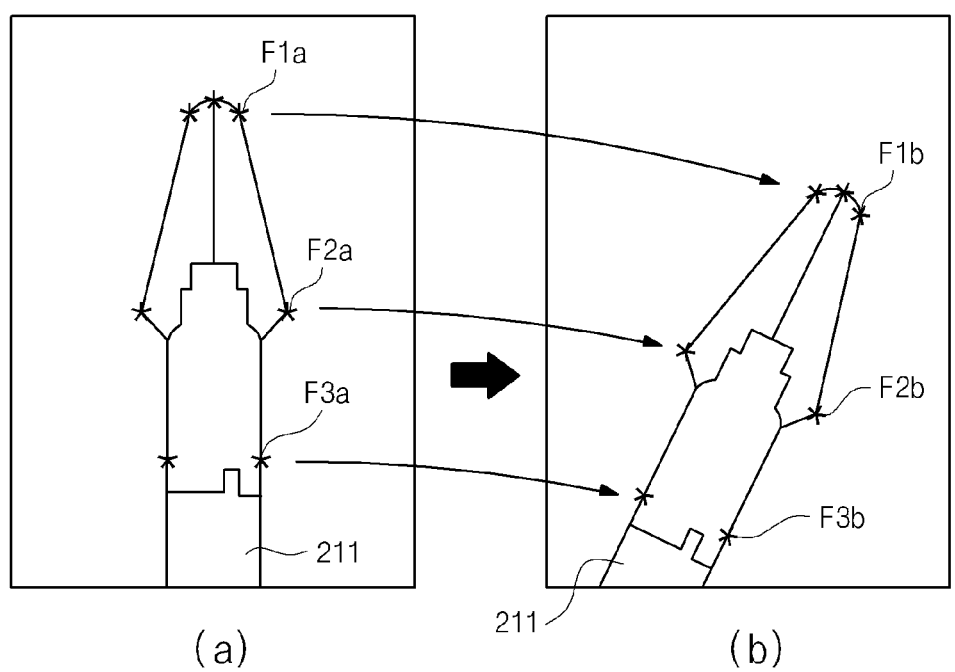
FIG. 17 is a view for explaining a surgical instrument displacement measurement method.

FIG. 17 is a view for explaining a surgical instrument displacement measurement method.

The tracking unit 140 extracts pre-movement feature points F1a, F2a and F3a of the first surgical instrument 211 as illustrated in FIG. 17(a) and, when the first surgical instrument 211 moves according to a user's operation or the like as illustrated in FIG. 17(b), the tracking unit 140 extracts post-movement feature points F1b, F2b and F3b of the first surgical instrument 211. Then, displacements Δu of the feature points of the first surgical instrument 211 are calculated by comparing the pre-movement feature points F1a, F2a and F3a with the post-movement feature points F1b, F2b and F3b. For example, the displacements Δu of the feature points of the first surgical instrument 211 may be calculated using Equation 1 above.

Figure 18:
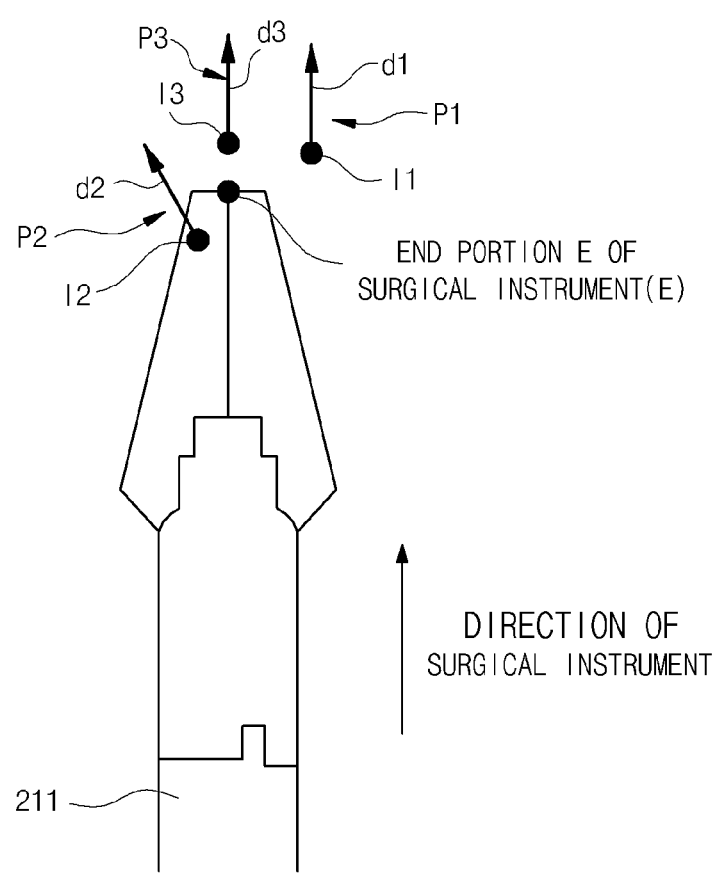
FIGS. 18 and 19 are views for explaining particles of a surgical instrument.
Figure 19:
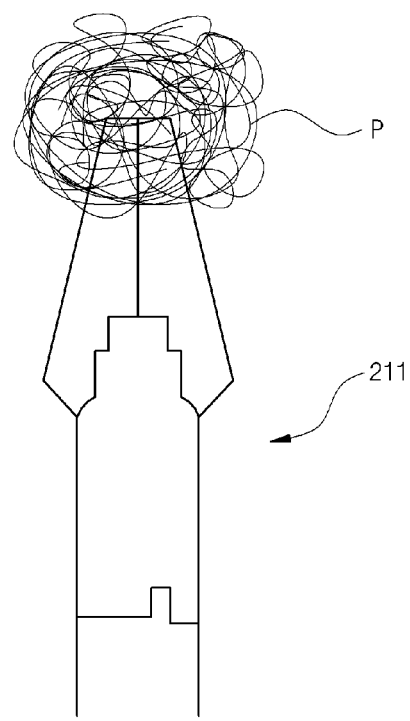

Subsequently, the tracking unit 140 performs particle filtering. FIGS. 18 and 19 are views for explaining particles P of the first surgical instrument 211.

In an embodiment, the tracking unit 140 may perform sampling of a plurality of particles P1, P2 and P3 for estimation of a tool tip E of the first surgical instrument 211 as illustrated in FIG. 18. As described above, the particles P are used to estimate a position, shape and/or direction of a moving object or a particular location in the moving object, with predetermined errors. Thus, each of the particles P1, P2 and P3 estimates a particular location in a moving object, e.g., the tool tip E of the first surgical instrument 211.

In this case, as illustrated in FIGS. 18 and 19, the particles P1, P2 and P3 may be obtained by generating a probability distribution of a pose of the first surgical instrument 211, e.g., a position and direction of the tool tip of the first surgical instrument 211, using the displacements Δu of the feature points of the first surgical instrument 211 and extracting the particles P1, P2 and P3 from the generated probability distribution according to a predetermined standard. For example, random extraction of the particles may be performed to perform sampling of the particles P1, P2 and P3.

In addition, particles P for post-motion position and direction of the tool tip of the first surgical instrument 211 may be calculated by applying the displacements Δu to the pre-obtained particles P for pre-motion position and direction of the tool tip of the first surgical instrument 211.

FIG. 18 illustrates three sampled particles, i.e., first and second and third sampled particles P1, P2 and P3. As illustrated in FIG. 18, the first sampled particle P1 estimates location and direction of the tool tip E of the first surgical instrument 211 as l1 and d1, respectively. Another sampled particle, i.e., the second sampled particle P2 estimates location and direction of the tool tip E of the first surgical instrument 211 as l2 and d2, respectively, and the third sampled particle P3 as l3 and d3, respectively.

When a considerably large number of particles P, e.g., 100 or more, are sampled, as illustrated in FIG. 19, particle distribution consisting of the particles P may be obtained.

The tracking unit 140 may calculate a weight ω for each sampled particle by acquiring pose information of the corresponding surgical instrument simultaneously together with a particle sampling process or at different times therefrom.

Figure 20:
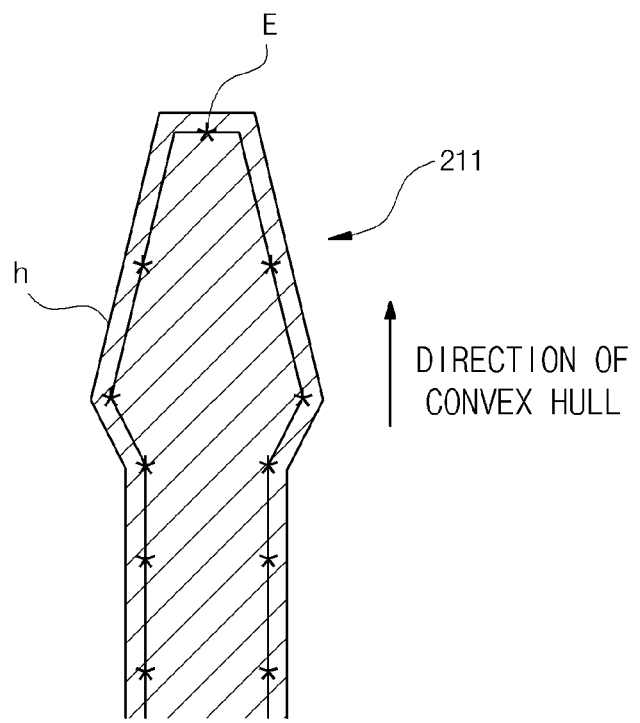
FIGS. 20 and 21 are views for explaining pose information of the surgical instrument.
Figure 21:
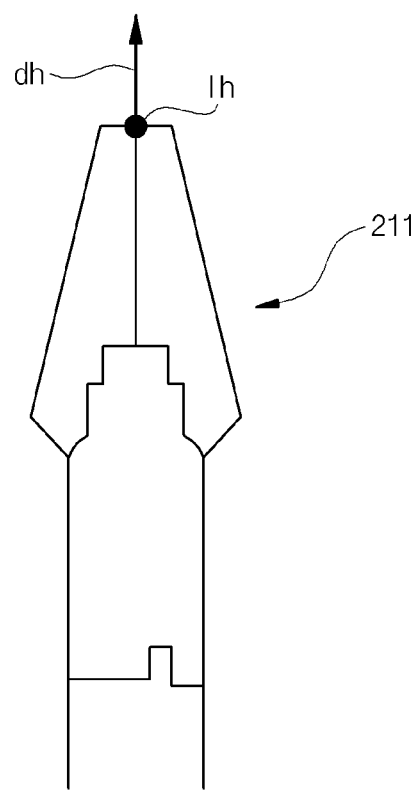

FIGS. 20 and 21 are views for explaining pose information of the first surgical instrument 211.

The tracking unit 140 may acquire pose information of the first surgical instrument 211 as described above with reference to FIGS. 11A to 11D. In particular, the tracking unit 40 may separately extract the feature points F of the first surgical instrument 211. In another embodiment, at least one contour of the first surgical instrument 211 may be obtained using the feature points F used in the above-described displacement calculation, and the obtained contour thereof may be used to calculate a convex hull as illustrated in FIG. 20.

Subsequently, the tracking unit 140 may calculate a central point or end portion E of the convex hull h and a direction of the convex hull h using moments of all points constituting the convex hull h. As a result, as illustrated in FIG. 21, information on a direction dh of the convex hull h and a location lh of the end portion E of the convex hull h may be acquired.

The tracking unit 140 may acquire the direction and location of the tool tip of the first surgical instrument 211 through the direction dh of the convex hull h and the location lh of the end portion E of the convex hull h.

In addition, the tracking unit 140 may calculate a likelihood of a pose of the first surgical instrument 211 estimated by each particle, e.g., the direction of the first surgical instrument 211 and the location of the tool tip thereof, by applying random noise to the calculated pose information of the first surgical instrument 211 and modeling the random noise-applied pose information through Gaussian distribution, thereby determining a weight for each particle. For example, determination of the weight for each particle may be performed using Equation 4 above.

Subsequently, the tracking unit 140 corrects estimates for a pose of the first surgical instrument 211, e.g., the direction of the first surgical instrument 211 and the location of the tool tip thereof, by the particles P, using each weight ω for each particle P.

Figure 22:
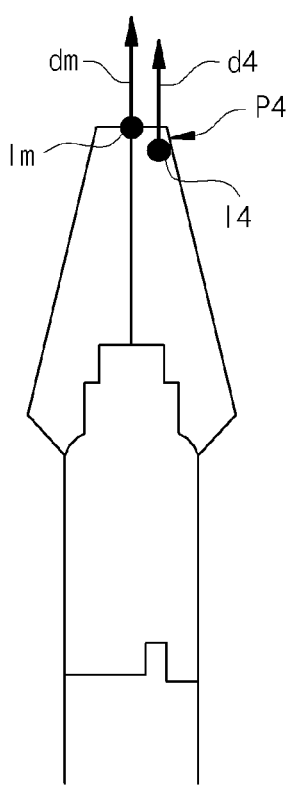
FIG. 22 is a view for explaining an example of estimation of the surgical instrument using particles by applying a weight thereto.

In other words, as illustrated in FIG. 22, at least one particle, i.e., a resulting particle P4, of the particles P1, P2 and P3 of the first surgical instrument 211, may be determined using each particle P and each weight ω for each particle P. In this case, the resulting particle P4 may be a particle that most appropriately estimates the location or the position of the tool tip of the first surgical instrument 211 and direction thereof.

FIG. 22 is a view for explaining an example of estimation of the first surgical instrument 211 using particles by applying a weight thereto. FIG. 22 illustrates the determined resulting particle P4. The resulting particle P4 may have the same location and direction as a location lm and direction dm of an actual tool tip of the first surgical instrument 211, but may have some errors.

The resulting particle P4 may be determined using various methods as described above. For example, the resulting particle P4 may be selected from the particles P1, P2 and P3 based on the magnitude of the weight of each particle. In another embodiment, a weighted average for location and direction estimated by each particle P1, P2 or P3 may be calculated using each particle P1, P2 or P3 and each weight ω therefor, and a weight-averaged particle estimating the calculated weighted average for location and direction may be determined as the resulting particle P4. In addition, a particle estimating an average of location and direction estimated by each particle may be determined as the resulting particle P4 regardless of the weight ω. As a result, the resulting particle P4 as illustrated in FIG. 22 may be obtained.

In an embodiment, when the resulting particles P4 is obtained by the tracking unit 140, a predetermined image of the surgical instruments 210 may be generated based on the obtained resulting particle P4 and the generated image may be displayed on the display unit d. In this regard, directions and locations of the surgical instruments 210 contained in the image are in accordance with estimation performed by the resulting particle P4. As a result, user convenience for poses and manipulation of the surgical instruments 210 may be improved.

In addition, the tracking unit 140 may determine a display state of the surgical instruments 210 using feature points F of the surgical instruments 210. In particular, the tracking unit 140 may extract tracked feature points F of the surgical instruments 210 contained in the image and determine whether all, some or none of the surgical instruments 210 are displayed in the image using the extracted tracked feature points F.

In this regard, the display state of the surgical instruments 210 may be any one of an all display state in which all of the surgical instruments 210 are displayed in the image, a partial display state in which the surgical instruments 210 are partially displayed in the image, and a non-display state in which none or almost none thereof is displayed in the image.

More particularly, the tracking unit 140 may determine the display state of the surgical instruments 210 using at least one selected from the number of tracked feature points F of the surgical instruments 210 that are extracted from an image in which the surgical instruments 210 are displayed or not displayed, a ratio of the extracted tracked feature points to total feature points of the surgical instruments 210, a matching ratio between feature points of the surgical instruments 210 in a region of interest set in the image and the extracted tracked feature points F, and the displacements Δu of the tracked feature points.

For example, determination of the display state or transition of the display state may be performed using only any two or all of the above-described methods. In addition, determination of transition of a particular display state may be performed using a particular method, and determination of transition to another display state may be performed using another method different from the particular method.

Figure 23:
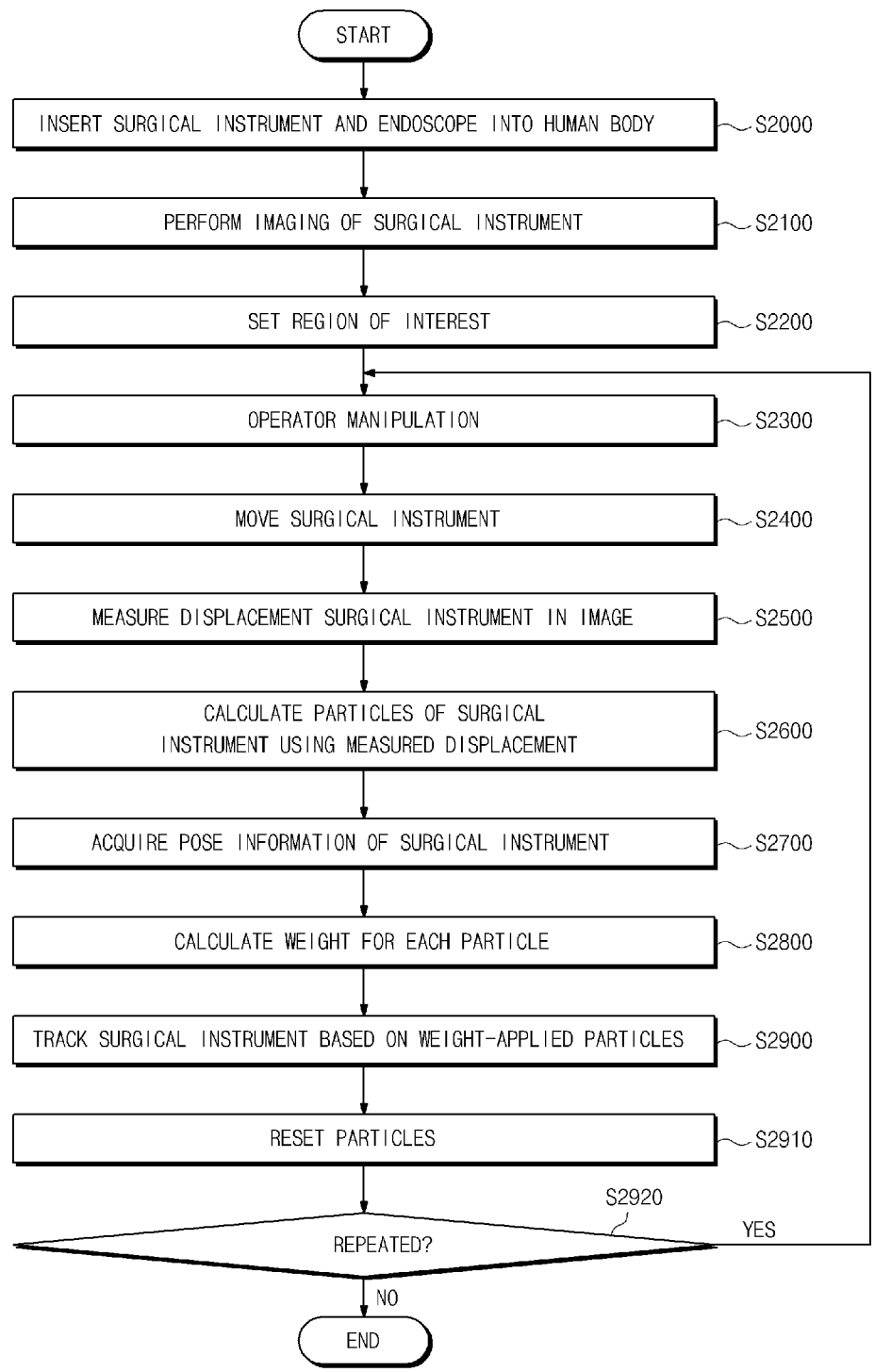
FIG. 23 is a flowchart illustrating a surgical robot control method according to an embodiment of the present invention.

FIG. 23 is a flowchart illustrating a surgical robot control method according to an embodiment of the present invention.

As illustrated in FIG. 23, according to the surgical robot control method, first, surgical instruments and an endoscope are inserted into the body of a patient. In this case, the endoscope may be inserted into the body of the patient and move therein while following the surgical instruments to perform imaging of the surgical instruments (operation S2000). While FIG. 14 and FIG. 23 show a patient in the form of a human, the surgical robot may be applicable to animals or other life forms. Further, the surgical robot and tracking method according to the example embodiments disclosed herein may generally be applied to objects, to perform an operation inside of the object. The object may be a person, animal, or thing, for example.

An image of the surgical instruments may be captured by the endoscope. In this case, image capture of the surgical instruments using the endoscope may be performed for a predetermined period of time and at a predetermined location, or be periodically performed. For example, imaging of the surgical instruments may be performed every hour (operation S2100). Alternatively, imaging may be performed every second, minute, fractions of time intervals, or at random time intervals.

Subsequently, the entire region or a partial region of the image captured by the endoscope is set as a region of interest. In this regard, in some embodiments, a user may check the image captured by the endoscope and set a predetermined region of interest in the captured image. In addition, the region-of-interest setting unit 120 of the surgical robot may set (e.g., automatically set) a region of interest according to predefined settings (operation S2200).

In an embodiment, after setting of the region of interest, particles for a tool tip of the surgical instruments in the region of interest may be sampled.

An operator manipulates the surgical instruments (operation S2300). According to operator manipulation, the surgical instruments change their poses by movement or direction change (operation S2400). The endoscope also performs imaging of changed poses of the surgical instruments.

Displacements between pre-pose change surgical instruments and post-pose change surgical instruments are measured using the image captured by the endoscope (operation S2500). In this regard, displacement measurement may be performed using feature points of the surgical instruments. In this case, the displacements of the surgical instruments may be measured in accordance with the displacements of the feature points.

Subsequently, particles of the surgical instruments may be calculated using the measured displacements between pre-pose change surgical instruments and post-pose change surgical instruments (operation S2600). For example, a probability distribution for changed poses of the surgical instruments may be calculated by applying the displacements of the surgical instruments thereto, and at least one particle for each surgical instrument may be extracted from the calculated probability distribution.

In some embodiments, if particles for the pre-pose change surgical instruments are previously extracted, particles for the post-pose change surgical instruments may be calculated by applying the displacements to the previously extracted particles.

In some embodiments, after a particle calculation process (operation S2600), pose information of the surgical instruments may be acquired in combination with operation S2600 or before operation S2600 (operation S2700). The pose information of the surgical instruments may be acquired by acquiring contour information using the feature points of the surgical instruments, obtaining a convex hull using the contour information, and acquiring location and direction information of a tool tip of each surgical instrument by calculating a central point or end portion of the convex hull and a direction of the convex hull.

A weight for each particle may be calculated using the acquired pose information of the surgical instruments (operation S2800). In this case, the pose information of the surgical instruments may be modeled through a predetermined distribution, e.g., Gaussian distribution to calculate a likelihood of each particle and the weight for each particle may be calculated according to the calculated likelihood.

Next, the weight may be applied to each particle and the surgical instruments may be tracked based on the weight-applied particles. In this regard, an average of locations and directions of the weight-applied particles may be calculated, and a particle estimating location and direction corresponding to the calculated average may be regarded as a resulting particle (operation S2900). In some embodiments, a particle having the greatest weight may be regarded as a resulting particle. As a result, current poses of the surgical instruments are predicted and estimated.

In some embodiments, the particles may be reset by re-sampling all or some of the particles using the above-described particle weight (operation S2910). In this case, the particles may be reset by selecting particles having weights within a predetermined range.

If a surgical instrument tracking process is repeated (operation S2920), the reset particles may be used to calculate new particles after the surgical instruments move again.

A minimally invasive surgical robot according to the example embodiments disclosed herein applies a moving object tracking method and includes a control apparatus for tracking the moving object. However, an application example of the control apparatus is not limited to the surgical robot. For example, the control apparatus may also be applied to a variety of equipment used in the medical field. In addition, when equipment such as various industrial robots used in various other industrial fields as well as medical industries needs to track objects to be tracked, the above-described method and apparatus or partially modified embodiments thereof may be applied to equipment such as various industrial robots and the like.

For example, the disclosure may be directed to settings other than a medical environment. For example, the methods and control apparatuses according to the example embodiments may be utilized to perform operations in any confined space or enclosure in which an operator may need to perform controlled movements using an instrument attached to a robot arm, so as to avoid or to prevent injuries to bodies or objects, that may be located or disposed within the space or enclosure, due to imprecise movements of the robot. The methods and control apparatuses according to the example embodiments may be applied to, for example, mining operations, surveillance operations, inspection operations, repair operations, bomb disposal operations, etc., however again, the disclosure is not so limited. Further, while the operator may be a doctor, the operator generally may be any user, and need not be a doctor.

As is apparent from the above description, according to the above-described moving object tracking method and the control apparatus for tracking the moving object, directions, locations or the like of the objects to be tracked may be appropriately and easily tracked.

In addition, it may be possible to accurately determine movement locations of the objects to be tracked, and the strength of the tracking of the objects to be tracked is enhanced.

Moreover, accuracy of movement of the objects to be tracked may be improved when moving the objects to be tracked. Accordingly, collision between the objects to be tracked or collision between the objects to be tracked and other objects may be prevented.

When a laparoscopic surgery is performed using the surgical robot, an operator that manipulates the surgical robot may appropriately receive information on locations, poses, directions or the like of surgical instruments and thus surgery convenience is improved.

Furthermore, inappropriate collision of surgical instruments with organs in the body of a patient may also be prevented, which leads to prevention of medical accidents.

The apparatus and methods according to the above-described example embodiments may use one or more processors. For example, a processing device may be implemented using one or more general-purpose or special purpose computers, such as, for example, a processor, an image processor, a controller and an arithmetic logic unit, a central processing unit (CPU), a graphics processing unit (GPU), a digital signal processor (DSP), a microcomputer, a field programmable array, a programmable logic unit, an application-specific integrated circuit (ASIC), a microprocessor or any other device capable of responding to and executing instructions in a defined manner.

The terms "module", and "unit," as used herein, may refer to, but are not limited to, a software or hardware component or device, such as a Field Programmable Gate Array (FPGA) or Application Specific Integrated Circuit (ASIC), which performs certain tasks. A module or unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules/units may be combined into fewer components and modules/units or further separated into additional components and modules.

Some example embodiments of the present disclosure can also be embodied as a computer readable medium including computer readable code/instruction to control at least one component of the above-described example embodiments. The medium may be any medium that can storage and/or transmission the computer readable code.

Aspects of the above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The media may be transfer media such as optical lines, metal lines, or waveguides including a carrier wave for transmitting a signal designating the program command and the data construction. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa. In addition, a non-transitory computer-readable storage medium may be distributed among computer systems connected through a network and computer-readable codes or program instructions may be stored and executed in a decentralized manner. In addition, the computer-readable storage media may also be embodied in at least one application specific integrated circuit (ASIC) or Field Programmable Gate Array (FPGA). Some or all of the operations performed according to the above-described example embodiments may be performed over a wired or wireless network, or a combination thereof.

Each block of the flowchart illustrations may represent a unit, module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved. Also, while an illustration may show an example of the direction of flow of information for a process, the direction of flow of information may also be performed in the opposite direction for a same process or for a different process.

Although example embodiments of the present invention have been shown and described, it would be appreciated by those skilled in the art that changes may be made to these embodiments without departing from the principles and spirit of the invention, the scope of which is defined in the claims and their equivalents.

What is claimed is:

1. A method of tracking an object, the method comprising:
  measuring displacement of the object;
  acquiring pose information of the object from an image, the pose information being post-movement pose information after the displacement of the object, the acquiring pose information of the object including,
    extracting feature points of the object,
    acquiring contour information of the object from the feature points of the object,
    obtaining a convex hull for the feature points using the contour information, and
    calculating location information and direction information for an end portion of the convex hull;
  obtaining a particle of the object using the measured displacement; and tracking the object using the pose information of the object and the obtained particle.

2. The method according to claim 1, wherein the tracking comprises:
calculating a weight for the particle using the pose information of the object; and
tracking the object by estimating a pose of the object using the weight for the particle and the obtained particle.

3. The method according to claim 2, wherein the obtaining comprises:
obtaining a plurality of particles of the object using the measured displacement of the object.

4. The method according to claim 3, further comprising:
resetting at least one particle from among the obtained particles according to the calculated weight such that an amount of particles in the obtained particles decreases by removing particles whose associated weight is below a threshold.

5. The method according to claim 1, wherein the measuring comprises:
measuring the displacement of the object based on displacements of the feature points.

6. The method according to claim 1, wherein the particle includes estimates for a location and direction of an end portion of the object.

7. The method according to claim 1, further comprising:
setting a region of interest containing the object to be tracked.

8. The method according to claim 7, wherein the setting comprises:
detecting the object by matching the image generated by an imaging module with feature points; and
setting the region of interest based on the detection results.

9. A control apparatus for tracking an object, the control apparatus comprising:
a processor and a memory, the memory containing computer readable code that, when executed by the processor, configures the processor as a tracking unit, the tracking unit configured to,
acquire displacement of the object using an image of the object,
acquire pose information of the object from the image, the pose information being post-movement pose information after the displacement of the object, the acquiring pose information of the object including,
extracting feature points of the object,
acquiring contour information of the object from the feature points of the object,
obtaining a convex hull for the feature points using the contour information, and
calculating location information and direction information for an end portion of the convex hull,
set a particle of the object using the acquired displacement of the object, and
track the object using the pose information of the object and the particle.

10. The control apparatus according to claim 9, wherein the tracking unit is configured to,
calculate a weight for the particle using the pose information of the object, and
track the object using the calculated weight for the particle and the particle.

11. The control apparatus according to claim 10, wherein the tracking unit is configured to obtain a plurality of particles of the object using the acquired displacement of the object.

12. The control apparatus according to claim 11, wherein the tracking unit is configured to reset at least one particle from among the obtained particles according to the calculated weight such that an amount of particles in the obtained particles decreases by removing particles whose associated weight is below a threshold.

13. The control apparatus according to claim 9, wherein the tracking unit is configured to measure the displacement of the object based on displacements of the feature points.

14. The control apparatus according to claim 9, wherein the particle includes estimates for a location and direction of an end portion of the object.

15. The control apparatus according to claim 14, wherein the pose information of the object is information on location and direction of the end portion of the object.

16. The control apparatus according to claim 9, wherein, the processor is further configured as a region of interest setting unit, the region of interest setting unit configured to set a region of interest containing the object to be tracked.

17. The control apparatus according to claim 16, wherein the region of interest setting unit is configured to,
detect the object by matching the image with feature points, and
set the region of interest based on the detection results.

* * * * *